United States Patent
Ishii et al.

(10) Patent No.: US 8,514,720 B2
(45) Date of Patent: Aug. 20, 2013

(54) BASE STATION APPARATUS, MOBILE STATION, MOBILE COMMUNICATION SYSTEM, AND COMMUNICATION CONTROL METHOD

(75) Inventors: Hiroyuki Ishii, Yokosuka (JP); Satoshi Nagata, Yokosuka (JP); Takehiro Nakamura, Yokohama (JP); Mikio Iwamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 727 days.

(21) Appl. No.: 12/523,329

(22) PCT Filed: Jan. 15, 2008

(86) PCT No.: PCT/JP2008/050367
§ 371 (c)(1),
(2), (4) Date: Aug. 19, 2009

(87) PCT Pub. No.: WO2008/087941
PCT Pub. Date: Jul. 24, 2008

(65) Prior Publication Data
US 2010/0080135 A1    Apr. 1, 2010

(30) Foreign Application Priority Data

| Jan. 19, 2007 | (JP) | 2007-010859 |
| Jan. 29, 2007 | (JP) | 2007-018578 |
| Jun. 6, 2007 | (JP) | 2007-150935 |
| Oct. 2, 2007 | (JP) | 2007-259240 |

(51) Int. Cl.
*H04W 4/00* (2009.01)

(52) U.S. Cl.
USPC ............... 370/241; 370/328; 370/465

(58) Field of Classification Search
None
See application file for complete search history.

(56) References Cited

U.S. PATENT DOCUMENTS

| 6,708,037 B1 * | 3/2004 | Moulsley et al. | 455/452.1 |
| 2005/0232158 A1 * | 10/2005 | Hondo | 370/241 |
| 2008/0049708 A1 * | 2/2008 | Khan et al. | 370/343 |
| 2008/0075043 A1 * | 3/2008 | Wang et al. | 370/330 |

FOREIGN PATENT DOCUMENTS

| JP | 8-317471 A | 11/1996 |
| JP | 2000-151494 A | 5/2000 |
| JP | 2001-251658 A | 9/2001 |
| JP | 2003-515274 A | 4/2003 |

OTHER PUBLICATIONS

International Search Report w/translation from PCT/JP2008/050367 dated May 13, 2008 (4 pages).
Written Opinion from PCT/JP2008/050367 dated May 13, 2008 (3 pages).
3GPP TR.25814 V7.0.0; "3rd Generation Partnership Project; Technical Specification Group Radio Access Network; Physical Layer Aspects for Evolved Universal Terrestrial radio Access (UTRA)"; Jun. 2006 (126 pages).

* cited by examiner

Primary Examiner — Kevin C Harper
(74) Attorney, Agent, or Firm — Osha Liang LLP

(57) ABSTRACT

A base station for communicating with a mobile station which transmits an uplink signal according to a frequency division multiplexing scheme includes a first measurement unit configured to measure reception power on a frequency band for the random access channel in uplink or a second measurement unit configured to measure the number of receptions of preambles on the random access channel. The base station may either control the frequency band for the random access channel or restrict transmission on the random access channel based on at least one of the reception power on the frequency band for the random access channel and the number of receptions of preambles on the random access channel.

4 Claims, 13 Drawing Sheets

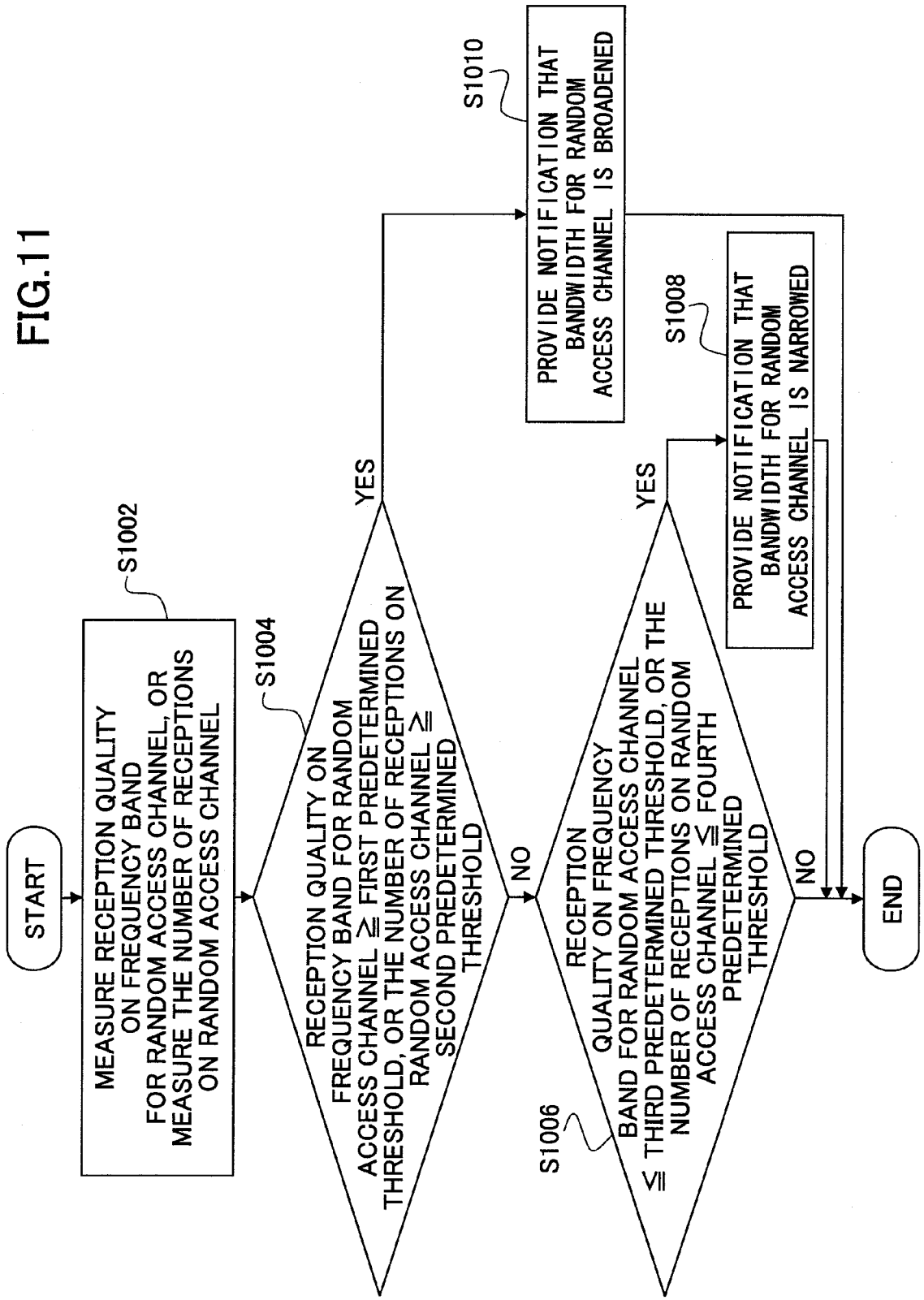

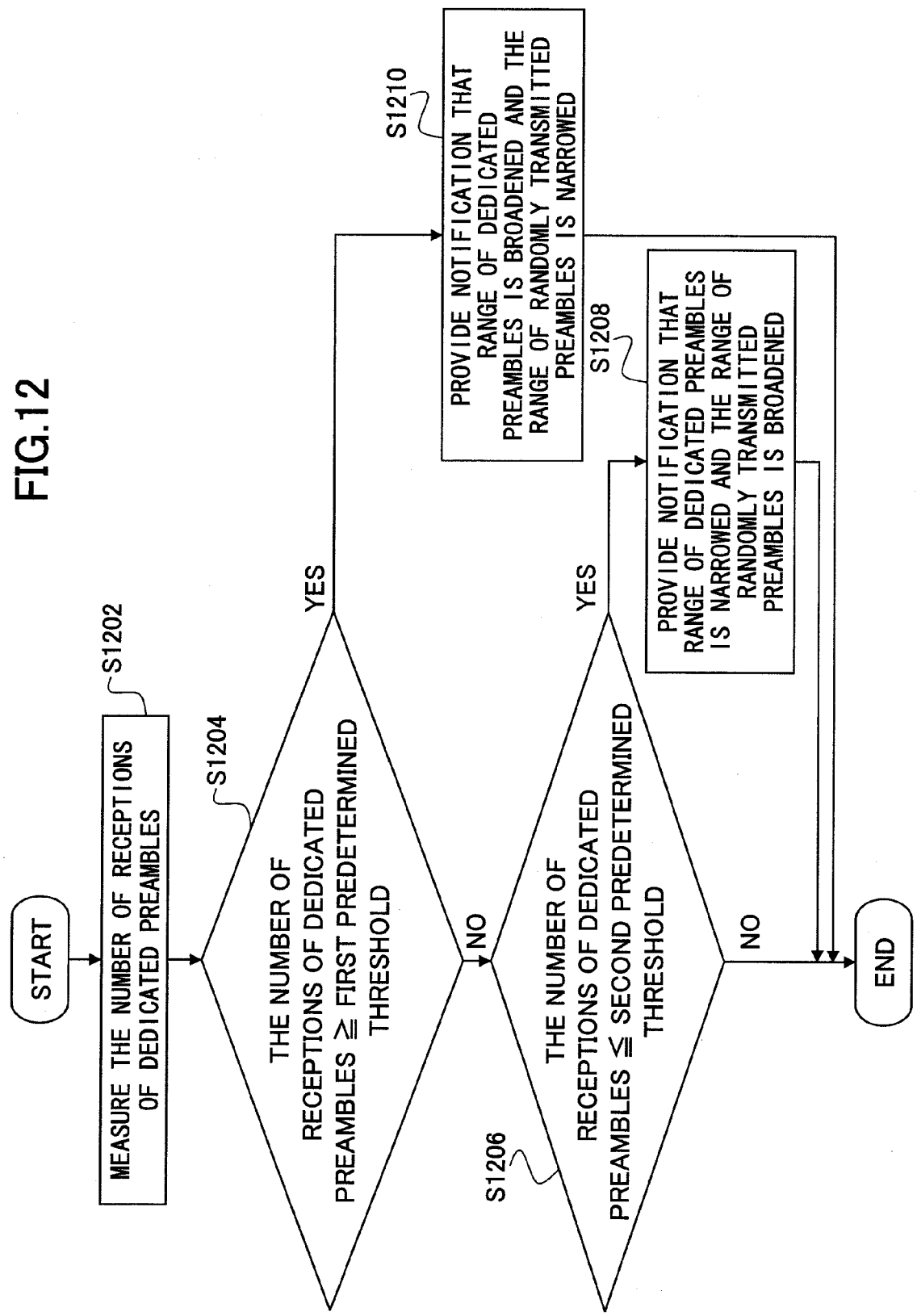

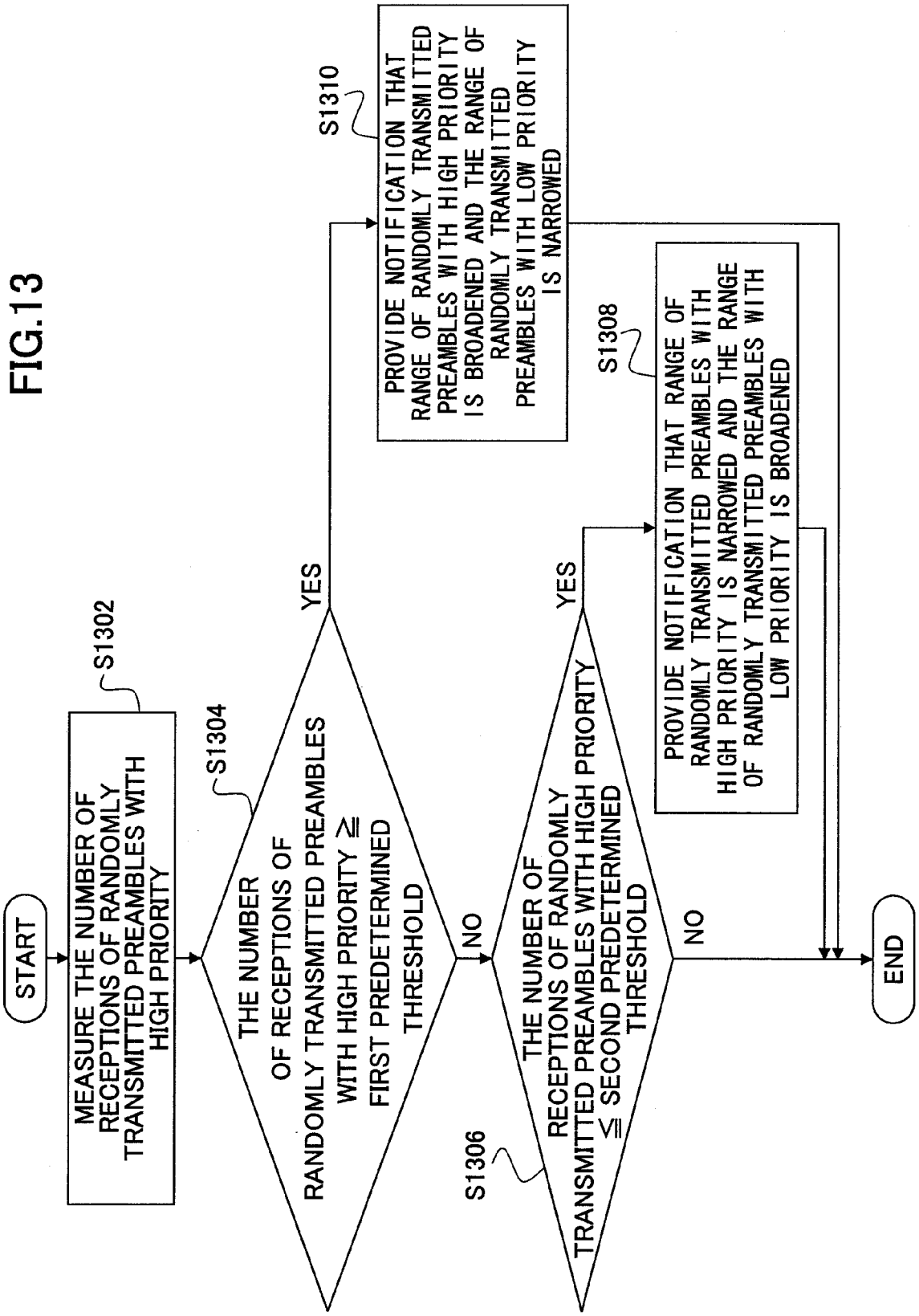

BASE STATION APPARATUS, MOBILE STATION, MOBILE COMMUNICATION SYSTEM, AND COMMUNICATION CONTROL METHOD

TECHNICAL FIELD

The present invention relates to a base station apparatus, a mobile station, a mobile communication system, and a random access control method.

BACKGROUND ART

A communication system as a successor of W-CDMA and HSDPA, namely, Long Term Evolution (LTE) has been considered by a W-CDMA standardization organization 3GPP. As a radio access scheme, Orthogonal Frequency Division Multiplexing (OFDM) is under consideration for downlink, and Single-Carrier Frequency Division Multiple Access (SC-FDMA) is under consideration for uplink (see 3GPP TR 25.814 (V7.0.0), "Physical Layer Aspects for Evolved UTRA", June 2006, for example).

In OFDM, a frequency band is divided into plural narrow frequency bands (sub-carriers), and data are placed on the respective divided frequency bands to carry out transmission. The sub-carriers are densely arranged in a frequency direction, allowing the sub-carriers to be partly overlapped without causing interference, thereby realizing high speed transmission and improving frequency usage efficiency.

In SC-FDMA, a frequency band is divided into plural narrow bands, and different narrow bands are used by different user terminals, so that interference between the user terminals can be reduced. According to SC-FDMA, which is characterized in that variations in the transmission power are reduced, a large coverage area and low energy consumption can be realized.

In the conventional W-CDMA uplink, which is characterized by a non-orthogonal system, all channels use the same frequency band, namely, the whole system band for communications. For example, a random access channel (RACH), which is used for establishing an initial connection in uplink, employs the combination of code-multiplexing and time-multiplexing schemes to carry out transmission in the system. The random access channel is also called a contention-based channel. A mobile station can use the random access channel at any timing in order to indicate its request for resource allocation.

In the W-CDMA system, as described above, both typical data channels and the random access channel use the same frequency band, namely, the whole system band. In addition, these channels are transmitted without orthogonalization. Thus, resources in the frequency direction are not managed for the typical data channels and the random access channel. When the amount of uplink interference is measured, the amount of interference for the whole system band including all channels is measured. Thus, the amount of interference for the random access channel need not be distinguished from the amount of interference for the typical data channels.

In the LTE system, as described above, SC-FDMA which is under consideration for the uplink radio access scheme is characterized by an orthogonal system. In SC-FDMA, a random access channel and typical data channels use mutually different frequency bands for transmission.

DISCLOSURE OF INVENTION

Problem(s) to be Solved by the Invention

In the LTE system, as described above, the uplink access scheme is characterized by an orthogonal system, and thus the random access channel and the typical data channels use mutually different frequency bands. Accordingly, a problem may arise when resources in the frequency direction are not managed for the typical data channels and the random access channel according to the conventional W-CDMA system. In addition, a problem may arise in that the amount of interference for the random access channel cannot be accurately measured when the amount of interference for the whole system band is measured according to the conventional W-CDMA system.

In view of these problems, it is a general object of the present invention to provide a base station apparatus, a mobile station, a mobile communication system, and a random access control method, in which the amount of interference for the random access channel can be measured and frequency resources for the random access channel can be managed in LTE uplink.

Means for Solving the Problem(s)

In one aspect of the present invention, there is provided a base station apparatus for communicating with a mobile station on a random access channel in uplink, including:
a first measurement unit configured to measure reception power on a frequency band for the random access channel.

The base station apparatus may further include a second measurement unit configured to measure the number of receptions of preambles on the random access channel.

The base station apparatus may further include a frequency bandwidth control unit configured to control a frequency bandwidth for the random access channel based on at least one of the reception power on the frequency band for the random access channel and the number of receptions of preambles on the random access channel.

The base station apparatus may further include a restricting unit configured to restrict transmission on the random access channel based on at least one of the reception power on the frequency band for the random access channel and the number of receptions of preambles on the random access channel.

The base station apparatus may further include a broadcast channel transmitting unit configured to transmit a broadcast signal on a broadcast channel which provides a notification that the frequency bandwidth for the random access channel is changed.

In another aspect of the present invention, there is provided a base station apparatus for communicating with a mobile station on a random access channel in uplink, including:
a broadcast channel transmitting unit configured to transmit a broadcast signal on a broadcast channel which provides a notification that a frequency bandwidth for the random access channel is changed.

In another aspect of the present invention, there is provided a mobile station for communicating with a base station apparatus on a random access channel in uplink, including:
a random access channel suspending unit configured to suspend transmission on the random access channel, when the base station apparatus determines to restrict transmission on the random access channel based on at least one of reception power on a frequency band for the random access channel and the number of receptions of preambles on the random access channel and transmits a broadcast signal on a broadcast channel which provides a notification that transmission on the random access channel is restricted.

In another aspect of the present invention, there is provided a mobile station for communicating with a base station apparatus on a random access channel in uplink, including:

a broadcast channel receiving unit configured to receive a broadcast signal on a broadcast channel, when the base station apparatus determines to change a frequency bandwidth for the random access channel based on at least one of reception power on a frequency band for the random access channel and the number of receptions of preambles on the random access channel and transmits the broadcast signal on the broadcast channel which provides a notification that the frequency bandwidth for the random access channel is changed; and a random access channel transmitting unit configured to transmit a signal on the random access channel with the changed frequency bandwidth.

In another aspect of the present invention, there is provided a mobile station for communicating with a base station apparatus on a random access channel in uplink, including:

a broadcast channel receiving unit configured to receive a broadcast signal on a broadcast channel, when the base station apparatus transmits the broadcast signal on the broadcast channel which provides a notification that a frequency bandwidth for the random access channel is changed; and a random access channel transmitting unit configured to transmit a signal on the random access channel with the changed frequency bandwidth.

In another aspect of the present invention, there is provided a mobile communication system including a mobile station and a base station apparatus for communicating with the mobile station on a random access channel in uplink, wherein the base station apparatus includes:

a determining unit configured to determine to change a frequency bandwidth for the random access channel based on at least one of reception power on a frequency band for the random access channel and the number of receptions of preambles on the random access channel; and a broadcast channel transmitting unit configured to transmit a broadcast signal on a broadcast channel which provides a notification that the frequency bandwidth for the random access channel is changed; and the base station apparatus and the mobile station include:

a communicating unit configured to communicate with each other on the random access channel with the changed frequency bandwidth.

In another aspect of the present invention, there is provided a mobile communication system including a mobile station and a base station apparatus for communicating with the mobile station on a random access channel in uplink, wherein the base station apparatus includes:

a broadcast channel transmitting unit configured to transmit a broadcast signal on a broadcast channel which provides a notification that a frequency bandwidth for the random access channel is changed; and the base station apparatus and the mobile station include:

a communicating unit configured to communicate with each other on the random access channel with the changed frequency bandwidth.

In another aspect of the present invention, there is provided a communication control method in a base station apparatus for communicating with a mobile station on a random access channel in uplink, including the steps of:

measuring reception power on a frequency band for the random access channel;

measuring the number of receptions of preambles on the random access channel;

determining to control a frequency bandwidth for the random access channel based on at least one of the reception power on the frequency band for the random access channel and the number of receptions of preambles on the random access channel; and transmitting a broadcast signal on a broadcast channel which provides a notification that the frequency bandwidth for the random access channel is changed.

In another aspect of the present invention, there is provided a base station apparatus for communicating with a mobile station on a random access channel in uplink, including:

a first measurement unit configured to measure the number of receptions of preambles on the random access channel in which dedicatedly assigned random access sequences are transmitted; and a second measurement unit configured to measure the number of receptions of preambles on the random access channel in which randomly selected random access sequences among plural random access sequences are transmitted.

In another aspect of the present invention, there is provided a base station apparatus for communicating with a mobile station on a random access channel in uplink, including:

a first measurement unit configured to measure the number of receptions of preambles on the random access channel in which individually assigned random access sequences are transmitted; and a sequence range control unit configured to control a range of dedicatedly assigned random access sequences and a range of randomly selected random access sequences based on the number of receptions of preambles.

In another aspect of the present invention, there is provided a base station apparatus for communicating with a mobile station on a random access channel in uplink, including:

a first measurement unit configured to measure the number of receptions of preambles on the random access channel in which randomly selected random access sequences with high priority are transmitted; and a sequence range control unit configured to control a range of randomly selected random access sequences with high priority and a range of randomly selected random access sequences with low priority based on the number of receptions of preambles.

Advantageous Effect of the Invention

According to an embodiment of the present invention, there are provided a base station apparatus, a mobile station, a mobile communication system, and a communication control method, in which the amount of interference for the random access channel in uplink can be accurately measured and resources can be efficiently managed.

BRIEF DESCRIPTION OF THE DRAWINGS

FIG. 11 shows a flowchart illustrating a communication control method according to an embodiment of the present invention.

FIG. 12 shows a flowchart illustrating a communication control method according to an embodiment of the present invention.

FIG. 13 shows a flowchart illustrating a communication control method according to an embodiment of the present invention.

DETAILED DESCRIPTION OF THE PREFERRED EMBODIMENTS

Description of Notations

Figure 1:
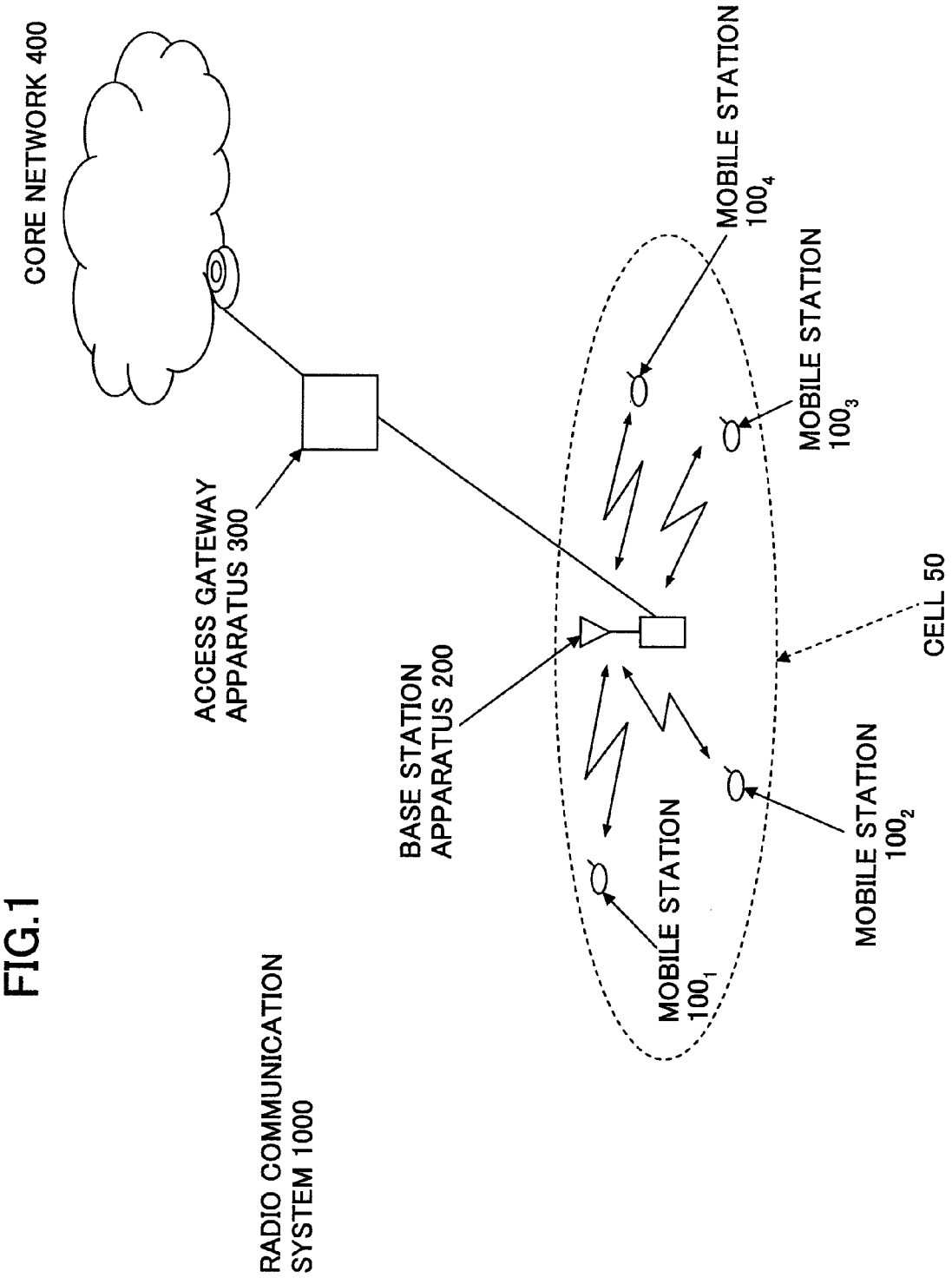
FIG. 1 shows a block diagram illustrating a configuration of a radio communication system according to an embodiment of the present invention.

| | |
|---|---|
| 50 | cell |
| $100_1$, $100_2$, $100_3$, $100_n$ | mobile station |
| 102 | transceiving antenna |
| 104 | amplification unit |
| 106 | transceiving unit |
| 108 | baseband signal processing unit |
| 110 | call processing unit |
| 112 | application unit |
| 200 | base station apparatus |
| 202 | transceiving antenna |
| 204 | amplification unit |
| 206 | transceiving unit |
| 208 | baseband signal processing unit |
| 210 | call processing unit |
| 212 | transmission path interface |
| 2081 | Layer-1 processing unit |
| 2082 | MAC processing unit |
| 2083 | RLC processing unit |
| 2084 | RACH resource management unit |
| 300 | access gateway apparatus |
| 400 | core network |
| 1000 | radio communication system |

BEST MODE OF CARRYING OUT THE INVENTION

With reference to the accompanying drawings, preferred embodiments of the present invention are described below. Throughout the drawings, corresponding elements are referenced by the same reference numerals and repetitive explanations are omitted.

Referring to FIG. 1, a radio communication system is explained below in which a base station apparatus according to an embodiment of the present invention is applied.

A radio communication system 1000, to which Evolved UTRA and UTRAN (another name: Long Term Evolution or Super 3G) is applied, includes a base station apparatus (eNB: eNodeB) 200 and plural mobile stations (UE: User Equipment) $100_n$ ($100_1$, $100_2$, $100_3$, . . . , $100_n$, n: an integer more than zero). The base station apparatus 200 is connected to an upper layer station, for example, an access gateway apparatus 300, and the access gateway apparatus 300 is connected to a core network 400.

Among mobile stations $100_n$, some mobile stations communicate with the base station apparatus 200 in a cell 50 under Evolved UTRA and UTRAN, and some mobile stations do not communicate with the base station apparatus 200 in the cell 50 under Evolved UTRA and UTRAN. For example, mobile stations which do not communicate with the base station apparatus 200 in the cell 50 under Evolved UTRA and UTRAN initiate communications by transmitting a signal to the base station apparatus 200 on a random access channel. Also, mobile stations which communicate with the base station apparatus 200 in the cell 50 under Evolved UTRA and UTRAN may transmit a signal on the random access channel for the purpose of handover, an uplink scheduling request, an uplink synchronization establishment request, and so on.

In the following, the mobile stations $100_1$, $100_2$, $100_3$, . . . , $100_n$ are referred to as the mobile station $100_n$, unless otherwise noted, because they have the same configuration, function, and condition.

The radio communication system 1000 employs Orthogonal Frequency Division Multiplexing (OFDM) for downlink and Single-Carrier Frequency Division Multiple Access (SC-OFDMA) for uplink as radio access schemes. As stated above, in OFDM, a frequency band is divided into plural narrow frequency bands (sub-carriers), and data are placed on the respective divided frequency bands to carry out transmission. In SC-FDMA, a frequency band is divided, and different frequency bands are used by different user terminals to carry out transmission, so that interference between the user terminals can be reduced.

Communication channels in Evolved UTRA and UTRAN are explained below.

In downlink, a Physical Downlink Shared Channel (PDSCH) shared by the mobile stations $100_n$ and a downlink control channel (PDCCH: Physical Downlink Control Channel) for LTE are used. Namely, the downlink channels mean the PDSCH and the downlink control channel for LTE. In downlink, transport format information and user identification of user, to which PDSCH is transmitted, transport format information and user identification of user, to which Physical Uplink Shared Channel (PUSCH), acknowledgement information of the PUSCH is transmitted, and so on are provided on the downlink control channel for LTE, and user data are transmitted on the PDSCH.

In uplink, the PUSCH shared by the mobile stations $100_n$ and an uplink control channel for LTE are used. Namely, the uplink channels mean the PUSCH and the uplink control channel for LTE. The uplink control channel includes two types, i.e., a channel to be time-multiplexed with the PUSCH and a channel to be frequency-multiplexed with the PUSCH.

Figure 2:
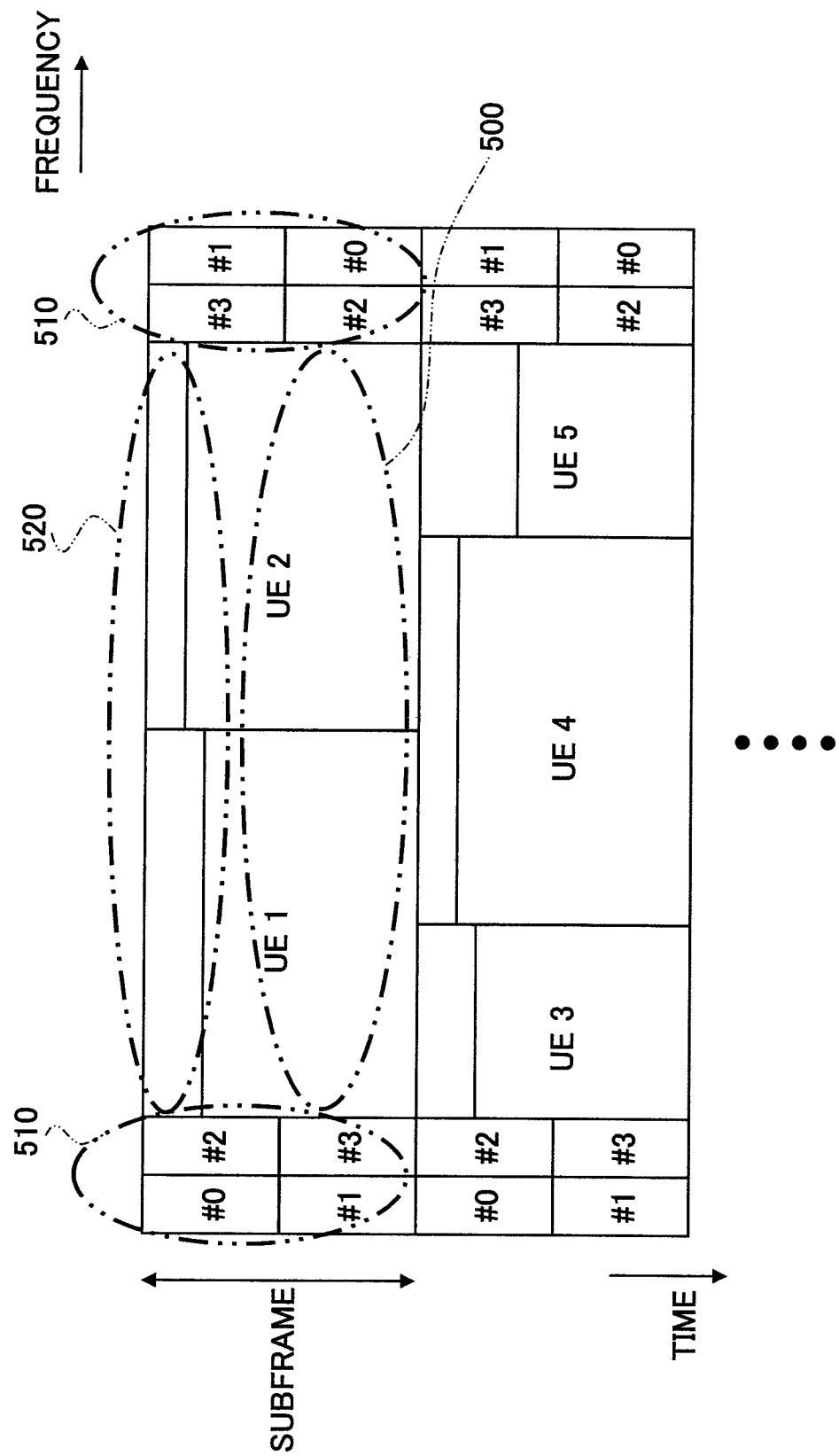
FIG. 2 shows an example of uplink control channel mapping.

FIG. 2 shows uplink control channel mapping. Frequency-multiplexed uplink control channels are mapped to different locations between two slots in the subframe in FIG. 2 (or frequency hopping is carried out). "500" represents the PUSCH, "510s" represent the channels frequency-multiplexed with the PUSCH, and "520" represents the channels time-multiplexed with the PUSCH in FIG. 2.

In uplink, PDSCH scheduling, downlink quality information (Channel Quality Indicator (CQI)) to be used for Adaptive Modulation and Coding Scheme (AMCS), and acknowledge information (HARQ ACK information) of the PDSCH are transmitted on the uplink control channel for LTE. In addition, user data are transmitted on the PUSCH.

Figure 3:
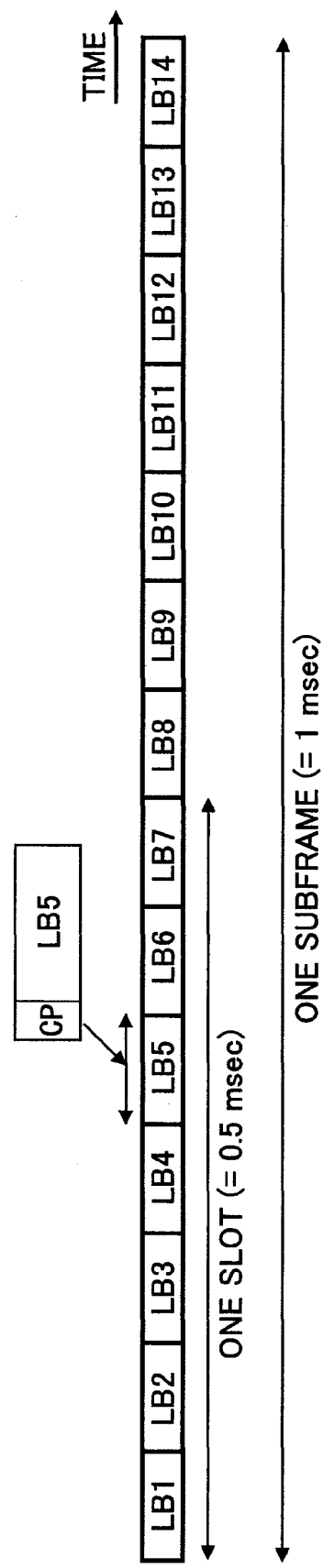
FIG. 3 shows a configuration of a subframe and slots.

In uplink transmission, use of seven long blocks (LBs) for each slot is under consideration. Because one subframe includes two slots, one subframe includes fourteen long blocks as shown in FIG. 3. Reference signals for data demodulation (i.e., Demodulation Reference Signals) are mapped to two long blocks of the fourteen long blocks. A reference signal for sounding (i.e., Sounding Reference Signal), which is to be used for determining a transmission format of the PUSCH for uplink AMC, TPC (transmission power control), and scheduling is transmitted through one long block of the fourteen long blocks except for the long blocks to which the Demodulation Reference Signals are mapped. In the long block in which the Sounding Reference Signal is transmitted, the Sounding Reference Signals from plural mobile stations are multiplexed according to Code Division Multiplexing (CDM). The Demodulation Reference Signals are mapped to the fourth long block and the eleventh long block in the subframe, for example. The Sounding Reference Signal is mapped to the first long block in the subframe, for example. The long blocks may be called SC-FDMA symbols.

Figure 4:
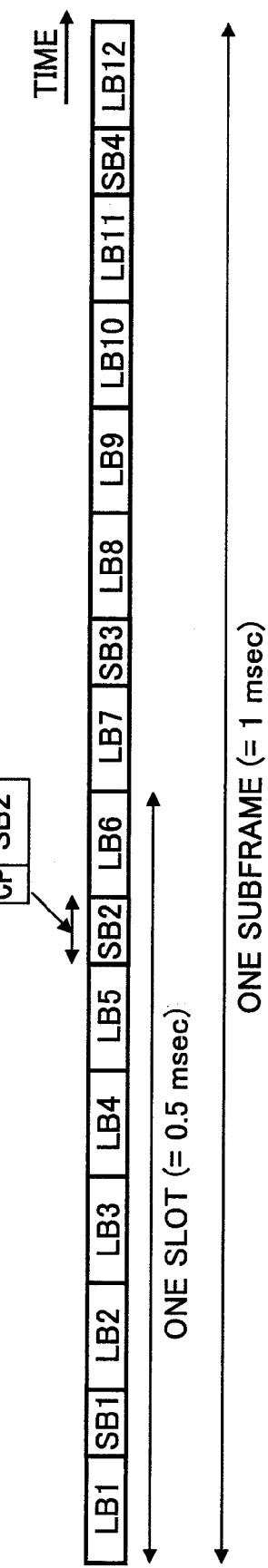
FIG. 4 shows a configuration of a subframe and slots.

Alternatively, use of two short blocks (SBs) and six long blocks (LBs) for each slot is under consideration as the uplink transmission format. Because one subframe includes two slots, one subframe includes four short blocks and twelve long blocks as shown in FIG. 4. The Sounding Reference Signal is mapped to one long block of the twelve. In the long block in which the Sounding Reference Signal is transmitted, the Sounding Reference Signals from plural mobile stations are multiplexed according to CDM. The four short blocks are used for the Demodulation Reference Signals. The Demodulation Reference Signals are mapped to four short blocks in the subframe, for example. The Sounding Reference Signal is mapped to the first long block in the subframe, for example.

In uplink, each mobile station $100_n$ transmits data in terms of resource blocks in the frequency direction and in terms of subframes in the time direction. In LTE, the frequency bandwidth for one resource block is equal to 180 kHz.

The random access channel in the LTE system is explained below.

Figure 5:
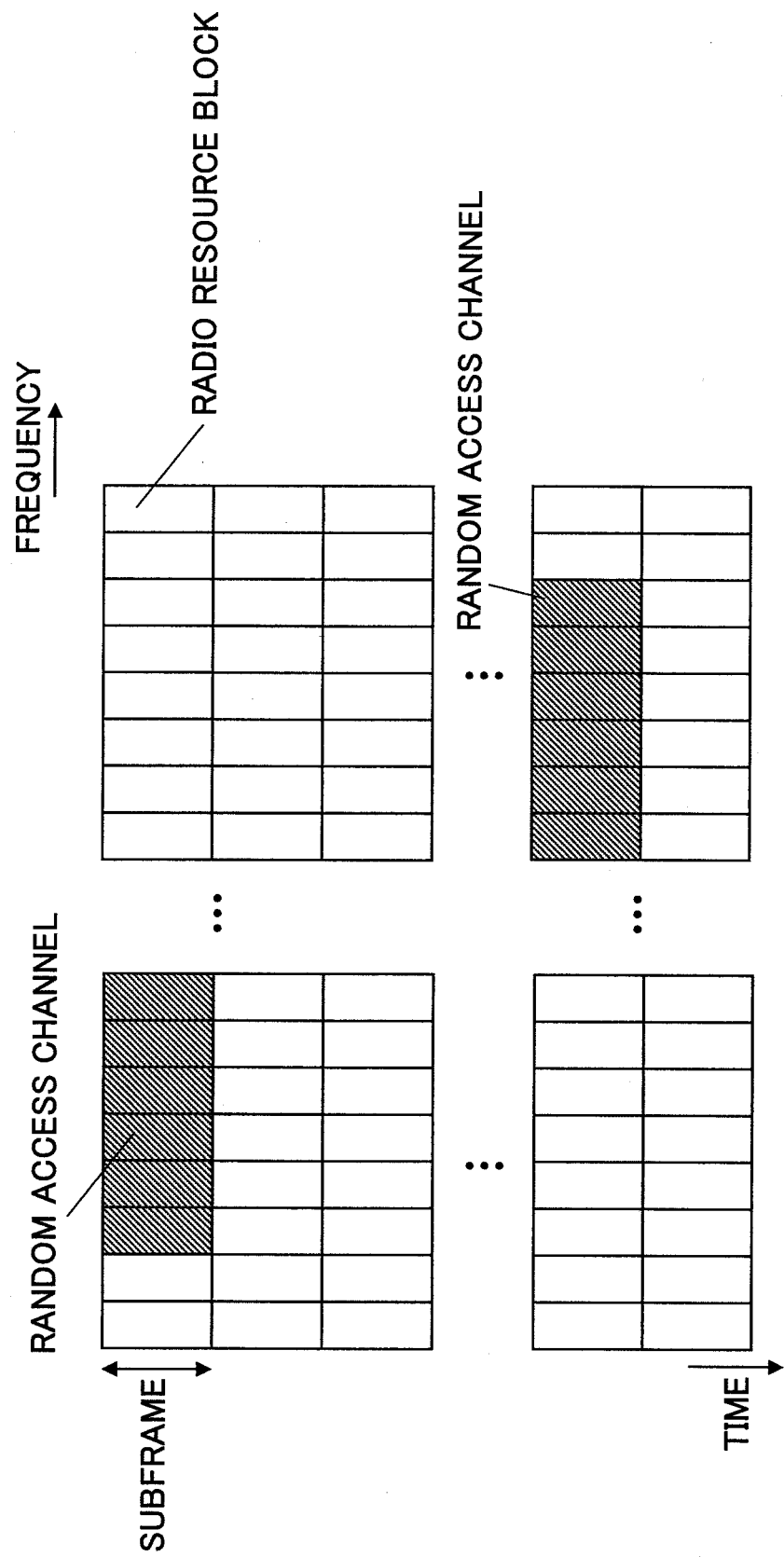
FIG. 5 shows an example of a multiplexing scheme for a random access channel.

The random access channel in the LTE system is multiplexed in a resource block using the frequency band and the time interval which are provided in advance on a broadcast channel by the base station apparatus. FIG. 5 shows an example of a multiplexing scheme for the random access channel. In LTE, it is expected that six resource blocks will be assigned to a transmission range, i.e., a frequency band for the random access channel. The frequency band including the six resource blocks corresponds to one frequency band for the random access channel. Plural frequency bands for the random access channel may be provided. Specifically, assuming that the frequency band including six resource blocks is defined as one physical random access channel, one or more physical random access channels may be provided.

For example, frequency bands (two physical random access channels) for two random access channels may include a frequency band including six resource blocks (one physical random access channel) and another frequency band including six resource blocks (one physical random access channel). The frequency bands (two physical random access channels) for two random access channels may adjacently or separately placed.

Alternatively, the number of random access channels may be variable in the time direction. For example, transmission patterns for the random access channel may be defined as shown in Table 1 and one of them may be specified by broadcast information.

TABLE 1

Transmission patterns for the random access channel

| Transmission pattern ID | Subframe number used for random access channel |
| --- | --- |
| 0 | 1 |
| 1 | 4 |
| 2 | 7 |
| 3 | 1, 6 |
| 4 | 2, 7 |
| 5 | 3, 8 |
| 6 | 1, 4, 7 |
| 7 | 2, 5, 8 |
| 8 | 3, 6, 9 |
| 9 | 0, 2, 4, 6, 8 |
| 10 | 1, 3, 5, 7, 9 |
| 11 | 0, 1, 2, 3, 4, 5, 6, 7, 8, 9 |

Figure 6:
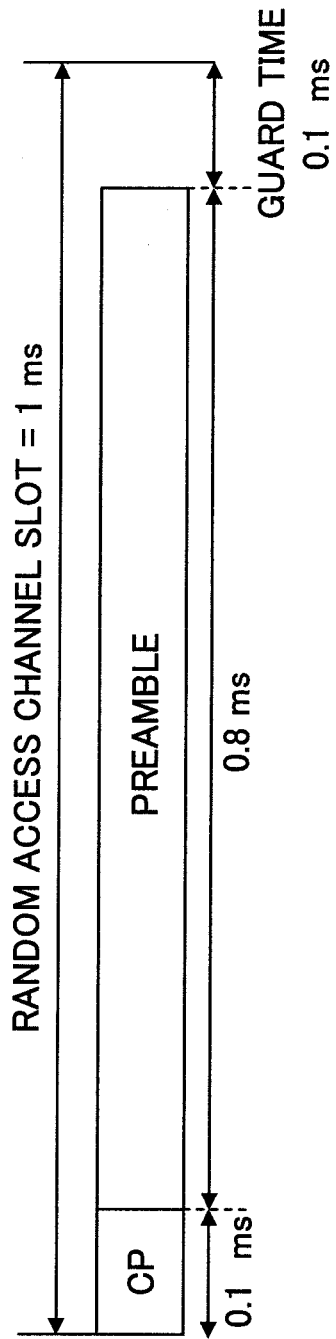
FIG. 6 shows an example of a frame format for a random access channel.

The signal length of the random access channel is designed to be longer, such that signals transmitted on the random access channel from the cell boundary can be detected by correlation calculation. FIG. 6 shows an example of a frame format for the random access channel. In the example shown in FIG. 6, the signal length of the random access channel is equal to 0.8 ms. A Cyclic Prefix (CP) of 0.1 ms and a guard time of 0.1 ms are included in the frame format. In this example, signals on the random access channel are formed only by a preamble sequence.

Regarding the random access channel in LTE, an individually assigned dedicated preamble and a randomly transmitted preamble are defined. The dedicated preamble is assigned to the mobile station during handover, when the mobile station accesses the base station apparatus targeted for handover, for example. In this case, collision on the random access channel does not occur, and consequently stable communications are realized, since no other mobile station uses the dedicated preamble. On the other hand, the randomly transmitted preamble is randomly selected from plural preambles and transmitted, as is the case with typical random access.

The dedicated preambles and the randomly transmitted preambles are distinguished based on their preamble IDs. For example, assuming that 64 preamble sequences and preamble IDs 0-63 are defined, preamble IDs 0-15 may be used for the dedicated preambles and preamble IDs 16-63 may be used for the randomly transmitted preambles. In the following, the range of dedicated preamble IDs such as preamble IDs 0-15 is called the range of dedicated preambles and the range of randomly transmitted preamble IDs such as 16-63 is called the range of randomly transmitted preambles.

For example, when a mobile station performs handover, the base station apparatus selects one of dedicated preambles whose preamble IDs are 0-15 and provides the preamble ID to the mobile station. Then, the mobile station performs random access using the provided preamble.

For example, when a mobile station performs initial access, on the other hand, the mobile station randomly selects one of the randomly transmitted preambles whose preamble IDs are 16-63. Then, the mobile station performs random access using the selected preamble.

The randomly transmitted preambles can be classified into preambles with high priority and preambles with low priority. For example, assuming that 64 preamble sequences and preamble IDs 0-63 are defined, preamble IDs 0-15 may be used for the dedicated preambles, preamble IDs 16-31 may be used for randomly transmitted preambles with high priority, and preamble IDs 32-63 may be used for the randomly transmitted preambles with low priority. In the following, the range of preamble IDs such as preamble IDs 16-31 is called the range of randomly transmitted preambles with high priority and the range of preamble IDs such as 32-63 is called the range of randomly transmitted preambles with low priority.

In this case, a mobile station with high priority or a mobile station which performs random access procedures with high priority can transmit the preamble with high priority. A mobile station with low priority or a mobile station which performs random access procedures with low priority can transmit the preamble with low priority. Specifically, the mobile station with high priority or the mobile station which performs random access procedures with high priority randomly selects one of preambles whose IDs are 16-31 and transmits the preamble. The mobile station with low priority or the mobile station which performs random access procedures with low priority randomly selects one of preambles whose IDs are 32-63 and transmits the preamble. It should be noted that the random access procedures mean procedures on the random access channel, such as initial access, handover, an uplink scheduling request, an uplink synchronization establishment request, a restart of downlink communications, and so on.

Classifying the range of random access preambles into the range of preambles with high priority and the range of preambles with low priority in this manner allows for priority control on the random access channel.

Although two types of priority, i.e., "high" and "low" are used in the above-mentioned example, three or more types of priority may be used.

Although two types of priority, i.e., "high" and "low" as types of random access preambles are used in the above-mentioned example, two levels of radio quality, i.e., "high" and "low" for the mobile station may be used. For example, the radio quality may be downlink radio quality. More specifically, the radio quality may be the reception level, SIR, CQI, or path loss of the downlink reference signal. For example, assuming that 64 preamble sequences and preamble IDs 0-63 are defined, preamble IDs 0-15 may be used for the dedicated preambles, preamble IDs 16-31 may be used for randomly transmitted preambles with high radio quality, and preamble IDs 32-63 may be used for the randomly transmitted preambles with low radio quality. In this case, a mobile station with high radio quality or a mobile station which performs random access procedures with high radio quality can transmit the preamble with high radio quality. A mobile station with low radio quality or a mobile station which performs random access procedures with low radio quality can transmit the preamble with low radio quality. Specifically, the mobile station with high radio quality or the mobile station which performs random access procedures with high radio quality randomly selects one of preambles whose IDs are 16-31 and transmits the preamble. The mobile station with low radio quality or the mobile station which performs random access procedures with low radio quality randomly selects one of preambles whose IDs are 32-63 and transmits the preamble.

When the base station apparatus does not have information about radio quality for the mobile station, the base station apparatus assumes that the mobile station is situated at the cell boundary and allocates radio resources for Message-2 or Message-3 in the random access procedures. As a result, resources are excessively consumed. Classifying the range of random access preambles into the range of preambles with high radio quality and the range of preambles with low radio quality allows the base station apparatus to know radio quality for the mobile station and efficiently allocate radio resources for Message-2 or Message-3 in the random access procedures.

It should be noted that assignment of random preamble IDs to dedicated preambles, randomly transmitted preambles, randomly transmitted preambles with high priority, and randomly transmitted preambles with low priority is provided from the base station apparatus to the mobile station.

Also, assignment of random preamble IDs to dedicated preambles, randomly transmitted preambles, randomly transmitted preambles with high radio quality, and randomly transmitted preambles with low radio quality is provided from the base station apparatus to the mobile station.

<Configuration of a Base Station Apparatus>

Figure 7:
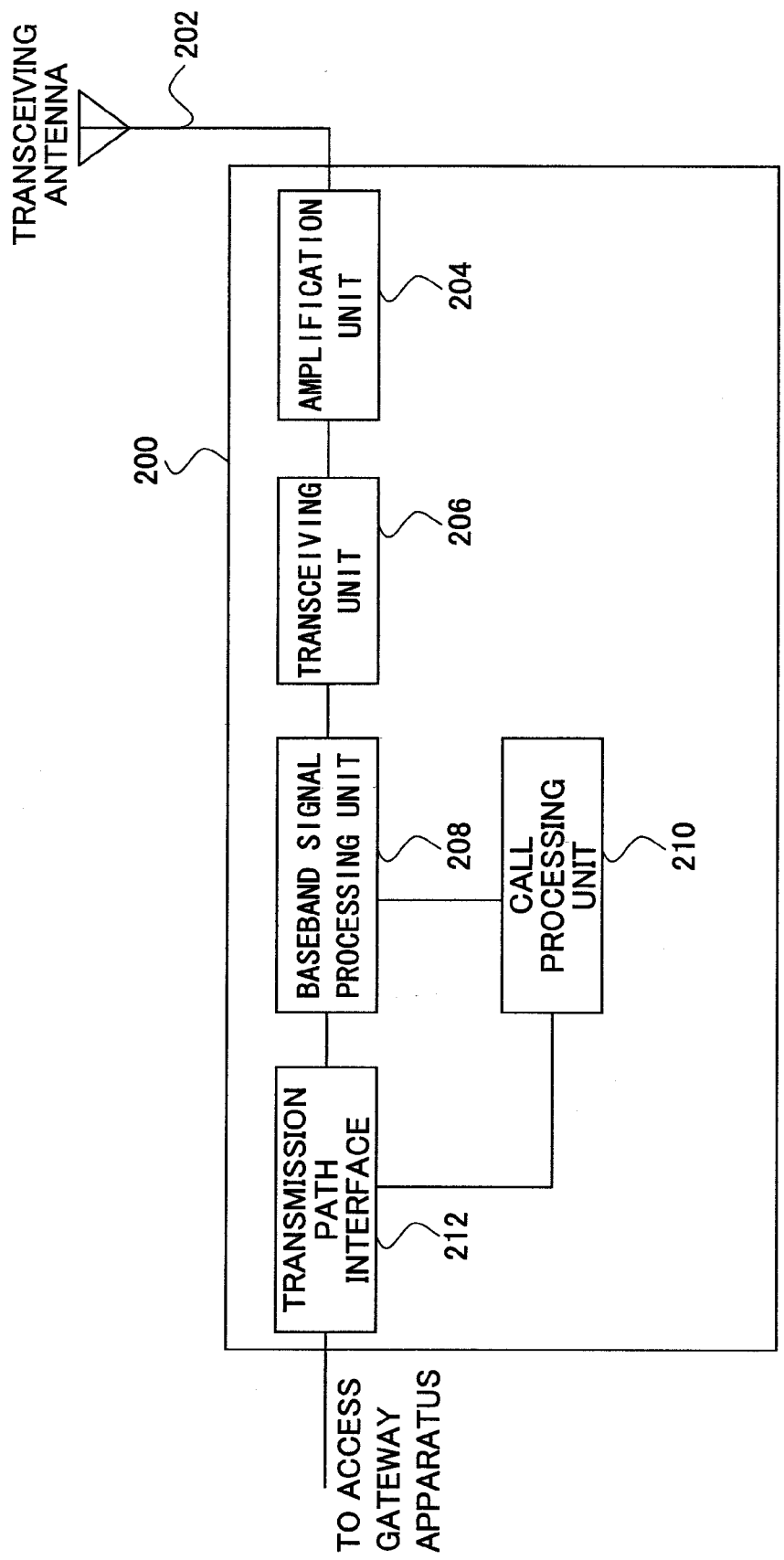
FIG. 7 shows a partial block diagram illustrating a base station apparatus according to an embodiment of the present invention.

Next, the base station apparatus 200 according to an embodiment of the present invention is explained below with reference to FIG. 7.

The base station apparatus 200 according to this embodiment includes a transceiving antenna 202, an amplification unit 204, a transceiving unit 206, a baseband signal processing unit 208, a call processing unit 210, and a transmission path interface 212.

Packet data to be transmitted from the base station apparatus 200 to the mobile station $100_n$ through downlink are input to the baseband signal processing unit 208 from the upper layer station, for example, the access gateway apparatus 300 associated with the base station apparatus 200 via the transmission path interface 212.

In the baseband signal processing unit 208, the packet data undergoes segmentation/concatenation, Radio Link Control (RLC) layer transmission processing such as RLC retransmission control, MAC retransmission control, for example, transmission processing of Hybrid Automatic Repeat request (HARQ), scheduling, transmission format selection, channel coding, and Inverse Fast Fourier Transform (IFFT) processing, and then is forwarded to the transceiving unit 206.

In the transceiving unit 206, the baseband signal output from the baseband signal processing unit 208 undergoes frequency conversion processing for converting the baseband signal to a radio frequency signal, which is then amplified by the amplification unit 204 and transmitted from the transceiving antenna 202.

On the other hand, regarding data transmitted from the mobile station $100_n$ to the base station apparatus 200 in uplink, the radio frequency signal received by the transceiving antenna 202 is amplified by the amplification unit 204, frequency-converted into a baseband signal by the transceiving unit 206, and input to the baseband signal processing unit 208.

In the baseband signal processing unit 208, the input baseband signal undergoes FFT processing, error correction decoding, reception processing for the MAC retransmission control, RLC layer reception processing, and is forwarded to the access gateway apparatus 300 via the transmission path interface 212.

In addition, the baseband signal processing unit 208 measures reception power on the frequency band for the random access channel and/or counts the number of received preamble sequences on the random access channel (hereinafter called the number of receptions of preambles on the random access channel). The baseband signal processing unit 208 determines to change the frequency band for the random access channel based on the reception power on the frequency band for the random access channel or the number of receptions of preambles on the random access channel. Alternatively, the base band signal processing unit 208 may determine to restrict transmission on the random access channel by mobile stations based on the reception power on the frequency band for the random access channel or the number of receptions of preambles on the random access channel.

The call processing unit 210 performs establishment or release of communication channels, status management of the base station apparatus 200, and management of radio resources.

When the call processing unit 210 receives, from the RACH resource management unit 2084 in the baseband signal processing unit 208, a notification that transmission on the random access channel by mobile stations is restricted, the call processing unit 210 provides, to mobile stations situated in the cell 50 which is covered by the base station apparatus 200, the notification that transmission on the random access channel by mobile stations is restricted, using the broadcast channel. When the call processing unit 210 receives, from the RACH resource management unit 2084 in the baseband signal processing unit 208, a notification that transmission on the random access channel by mobile stations is not restricted while the call processing unit 210 has provided the notification that transmission on the random access channel by mobile stations is restricted using the broadcast channel, the call processing unit 210 provides, to mobile stations situated in the cell 50 which is covered by the base station apparatus 200, the notification that transmission on the random access channel by mobile stations is not restricted, using the broadcast channel.

It should be noted that transmission on the random access channel by mobile stations may be restricted in consideration of the predetermined priority class of the mobile station. For example, the baseband signal processing unit 208 may determine to restrict transmission on the random access channel by mobile stations with a lower priority class.

Alternatively, when the call processing unit 210 receives, from the RACH resource management unit 2084 in the baseband signal processing unit 208, a notification that the frequency band for the random access channel is changed, the call processing unit 210 provides, to mobile stations situated in the cell 50 which is covered by the base station apparatus 200, the notification that the frequency band for the random access channel is changed, using the broadcast channel. Information regarding how the frequency band for the random access channel is changed is based on information received from the RACH resource management unit 2084. For example, the number of frequency bands (the number of physical random access channels) for the changed random access channel and the frequency numbers or the resource block numbers of the respective frequency bands (the frequency numbers or the resource block numbers of the respective physical random access channels) may be specified by the broadcast channel.

Namely, information elements on the broadcast channel include the number of frequency bands (the number of physical random access channels) for the random access channel and the frequency numbers or the resource block numbers of the respective frequency bands (the frequency numbers or the resource block numbers of the respective physical random access channels).

When the number of physical random access channels in the time direction rather than in the frequency direction is changed, as described below, the call processing unit 210 provides, to mobile stations situated in the cell 50 which is covered by the base station apparatus 200, the notification that the number of physical random access channels in the time direction is changed, using the broadcast channel. More specifically, when transmission patterns as shown in Table 1 are defined, the call processing unit 210 may provide a notification of the change of transmission patterns.

Alternatively, when the call processing unit 210 receives, from the RACH resource management unit 2084 in the baseband signal processing unit 208, a notification that the range of dedicated preambles and the range of randomly transmitted preambles are changed, the call processing unit 210 provides, to mobile stations situated in the cell 50 which is covered by the base station apparatus 200, the notification that the range of dedicated preambles and the range of randomly transmitted preambles are changed, using the broadcast channel. Information regarding the range of dedicated preambles and the range of randomly transmitted preambles is based on information received from the RACH resource management unit 2084. For example, IDs corresponding to the range of dedicated preambles and IDs corresponding to the range of randomly transmitted preambles may be specified by the broadcast channel.

Namely, information elements on the broadcast channel include IDs corresponding to the range of dedicated preambles and IDs corresponding to the range of randomly transmitted preambles.

Alternatively, when the call processing unit 210 receives, from the RACH resource management unit 2084 in the baseband signal processing unit 208, a notification that the range of randomly transmitted preambles with high priority and the range of randomly transmitted preambles with low priority are changed, the call processing unit 210 provides, to mobile stations situated in the cell 50 which is covered by the base station apparatus 200, the notification that the range of randomly transmitted preambles with high priority and the range of randomly transmitted preambles with low priority are changed, using the broadcast channel. Information regarding the range of randomly transmitted preambles with high priority and the range of randomly transmitted preambles with low priority is based on information received from the RACH resource management unit 2084. For example, IDs corresponding to the range of randomly transmitted preambles with high priority and IDs corresponding to the range of randomly transmitted preambles with low priority may be specified by the broadcast channel.

Namely, information elements on the broadcast channel include IDs corresponding to the range of randomly transmitted preambles with high priority and IDs corresponding to the range of randomly transmitted preambles with low priority.

Although two types of priority, i.e., "high" and "low" for the ranges of random access preambles are used in the above-mentioned example, two levels of radio quality, i.e., "high" and "low" for the mobile station may be used.

It should be noted that signals on the broadcast channel are transmitted to the mobile station via the MAC processing unit 2082, the Layer-1 processing unit 2081, the transceiving unit 206, the amplification unit 204, and the transceiving antenna 202.

Figure 8:
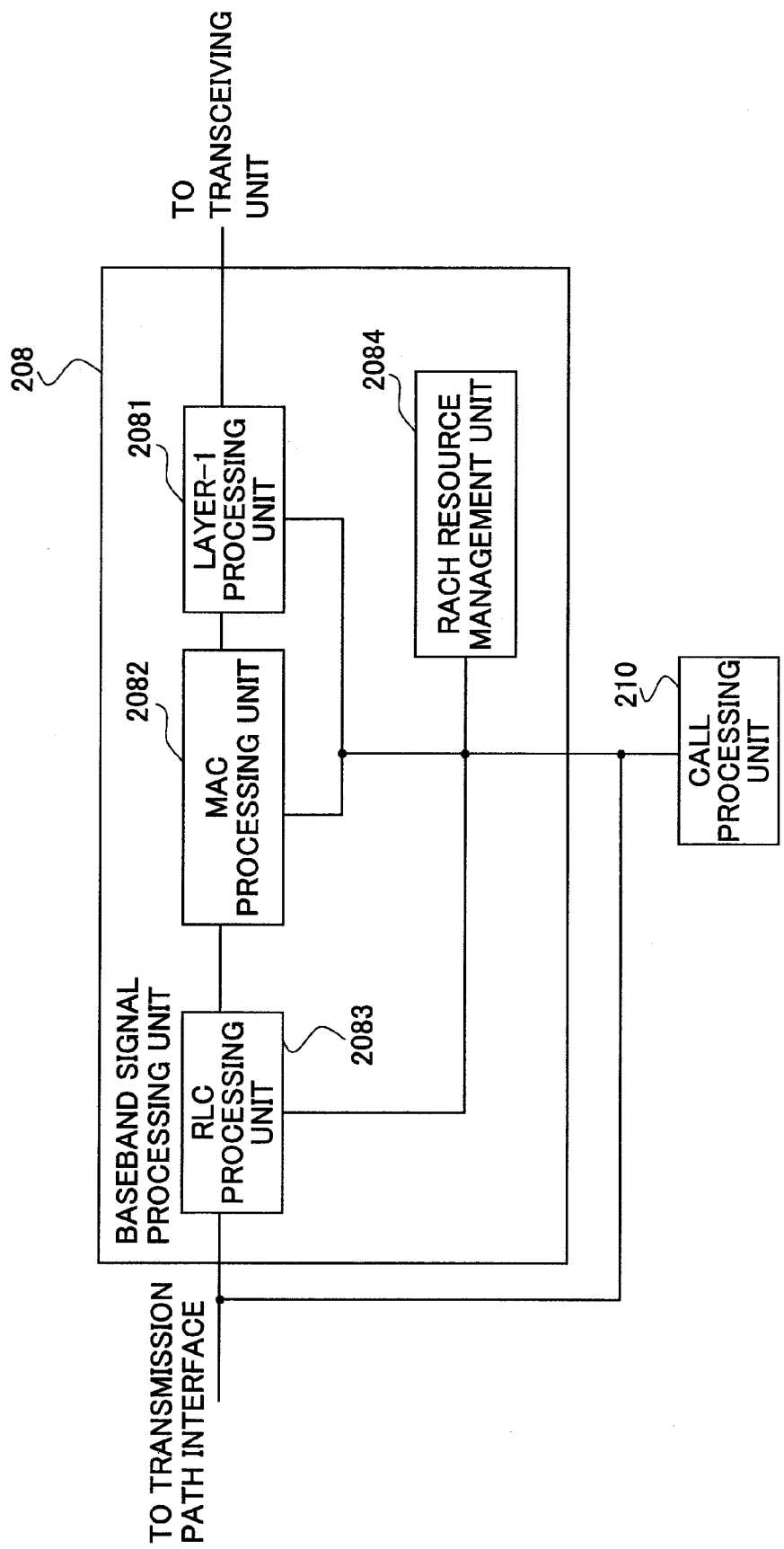
FIG. 8 shows a partial block diagram illustrating a baseband signal processing unit of the base station apparatus according to an embodiment of the present invention.

Next, a configuration of the baseband signal processing unit 208 is explained below with reference to FIG. 8.

The baseband signal processing unit 208 includes a Layer-1 processing unit 2081, a Medium Access Control (MAC) processing unit 2082, an RLC processing unit 2083, and a RACH resource management unit 2084. The Layer-1 processing unit 2081, the MAC processing unit 2082, the RLC processing unit 2083, and the RACH resource management unit 2084 in the baseband signal processing unit 208 are connected with one another.

The Layer-1 processing unit 2081 carries out channel coding and IFFT processing of the data transmitted in downlink, channel decoding and FFT processing of the data transmitted in uplink, and so on.

The Layer-1 processing unit 2081 measures reception power on the frequency band for the random access channel in uplink on which the mobile station $100_n$ transmits signals, and then provides to the RACH resource management unit 2084 the reception power on the frequency band for the random access channel in uplink. For example, the Layer-1 processing unit 2081 may measure reception power, which combines interference power including thermal noise and signal power, as the reception power on the frequency band for the random access channel in uplink. Alternatively, the Layer-1 processing unit 2081 may define reception power except for signal power as the reception power on the frequency band for the random access channel in uplink and measure interference power including thermal noise as the reception power on the frequency band for the random access channel in uplink.

In addition, the Layer-1 processing unit 2081 may measure the number of receptions of preambles on the random access channel in uplink on which the mobile station $100_n$ transmits signals, and then provides to the RACH resource management unit 2084 the number of receptions of preambles on the random access channel.

The Layer-1 processing unit 2081 may calculate the correlation value between the baseband signal provided by the transceiving unit 206 and each preamble sequence for the random access channel, and then measure the number of preamble sequences, the correlation value of which is above a predetermined threshold (hereinafter called the "detected" number of preamble sequences), as the number of receptions of preambles on the random access channel in uplink on which the mobile station $100_n$ transmits signals.

The Layer-1 processing unit 2081 may determine the detected number of preamble sequences for the random access channel in itself as the number of receptions of preambles on the random access channel in uplink on which the mobile station $100_n$ transmits signals. Alternatively, the Layer-1 processing unit 2081 may determine the detected number of preamble sequences on which RACH response (Message-2 in RACH procedures) is transmitted to the mobile station in downlink, i.e., the number of acknowledged preamble sequences, as the number of receptions of preambles on the random access channel.

It should be noted that the number of receptions of preambles on the random access channel may or may not include the number of dedicated preambles. The dedicated preamble means a preamble which is statically and dedicatedly assigned to a particular mobile station.

Alternatively, the Layer-1 processing unit 2081 may distinguish dedicated preambles from randomly transmitted preambles and measure the number of receptions of preambles on the random access channel. Alternatively, the Layer-1 processing unit 2081 may measure the randomly transmitted preambles based on each priority. Specifically, the Layer-1 processing unit 2081 may distinguish the number of receptions of randomly transmitted preambles with high priority from the number of receptions of randomly transmitted preambles with low priority and measure the number of receptions on the random access channel. Alternatively, the Layer-1 processing unit 2081 may measure the randomly transmitted preambles based on each radio quality, when ranges of randomly transmitted preambles are defined based on high and low radio quality. Specifically, the Layer-1 processing unit 2081 may distinguish the number of receptions of randomly transmitted preambles with high radio quality from the number of receptions of randomly transmitted preambles with low radio quality and measure the number of receptions on the random access channel.

Alternatively, the Layer-1 processing unit 2081 may measure the number of receptions on the random access channel based on the purpose of use of the random access channel, such as initial access, handover, an uplink scheduling request, an uplink synchronization establishment request, a restart of downlink communications, and so on.

The MAC processing unit 2082 carries out the downlink data MAC retransmission control, for example, transmission processing of the Hybrid Automatic Repeat request (HARQ), scheduling, transmission format selection, and so on. In addition, the MAC processing unit 2082 carries out the reception processing of the uplink MAC retransmission control, and so on.

In the RLC processing unit 2083, RLC layer transmission processing regarding the downlink packet data such as segmentation/coccatenation, transmission processing of the RLC retransmission control, and so on, and RLC layer reception processing regarding the uplink data such as segmentation/concatenation, the RLC retransmission control, and so on are carried out.

The RACH resource management unit 2084 receives from the Layer-1 processing unit 2081 the reception power on the frequency band for the random access channel in uplink and the number of receptions of preambles on the random access channel.

The RACH resource management unit 2084 determines whether to restrict transmission on the random access channel by mobile stations based on at least one of the reception power on the frequency band for the random access channel in uplink and the number of receptions of preambles on the random access channel. When the RACH resource management unit 2084 determines to restrict transmission on the random access channel by mobile stations, the RACH resource management unit 2084 provides to the call processing unit 210 a notification that transmission on the random access channel by mobile stations is restricted. Alternatively, when the RACH resource management unit 2084 determines not to restrict transmission on the random access channel by mobile stations while the call processing unit 210 has provided the notification that transmission on the random access channel by mobile stations is restricted using the broadcast channel, the RACH resource management unit 2084 provides to the call processing unit 210 a notification that transmission on the random access channel by mobile stations is not restricted.

The operations for the RACH resource management unit 2084 to determine whether to restrict transmission on the random access channel by mobile stations based on at least one of the reception power on the frequency band for the random access channel in uplink and the number of receptions of preambles on the random access channel are explained below in detail.

For example, the RACH resource management unit 2084 may determine to restrict transmission on the random access channel, when the reception power on the frequency band for the random access channel is above a predetermined threshold.

Alternatively, for example, the RACH resource management unit 2084 may determine to restrict transmission on the random access channel by mobile stations, when the number of receptions of preambles on the random access channel is above a predetermined threshold.

Alternatively, the RACH resource management unit 2084 may determine to restrict transmission on the random access channel by mobile stations, both when the reception power on the frequency band for the random access channel is above a predetermined threshold and when the number of receptions of preambles on the random access channel is above a predetermined threshold.

Alternatively, the RACH resource management unit 2084 may determine not to restrict transmission on the random access channel by mobile stations while the call processing unit 210 has provided the notification that transmission on the random access channel by mobile stations is restricted using the broadcast channel, either when the reception power on the frequency band for the random access channel is below a predetermined threshold and when the number of receptions of preambles on the random access channel is below a predetermined threshold.

The RACH resource management unit 2084 determines how to change the frequency band for the random access channel based on at least one of the reception power on the frequency band for the random access channel in uplink and the number of receptions of preambles on the random access channel. When the RACH resource management unit 2084 determines to change the frequency band for the random access channel by mobile stations, the RACH resource management unit 2084 provides to the call processing unit 210 a notification that the frequency band for the random access channel is changed. The RACH resource management unit 2084 also provides to the call processing unit 210 how to change the frequency band for the random access channel. For example, information about how to change the frequency band for the random access channel may be the changed number of frequency bands for the random access channel (the number of physical random access channels) or the frequency numbers or the resource block numbers of the respective frequency bands (the frequency numbers or the resource block numbers of the respective physical random access channels).

The operations for the RACH resource management unit 2084 to change the frequency band for the random access channel based on at least one of the reception power on the frequency band for the random access channel in uplink and the number of receptions of preambles on the random access channel are explained below in detail.

For example, the RACH resource management unit 2084 may determine to broaden the frequency band for the random access channel, when the reception power on the frequency band for the random access channel is above a predetermined threshold.

Alternatively, for example, the RACH resource management unit 2084 may determine to broaden the frequency band for the random access channel, when the number of receptions of preambles on the random access channel is above a predetermined threshold.

Alternatively, for example, the RACH resource management unit 2084 may determine to narrow the frequency band for the random access channel, when the reception power on the frequency band for the random access channel is below a predetermined threshold.

Alternatively, for example, the RACH resource management unit 2084 may determine to narrow the frequency band for the random access channel, when the number of receptions of preambles on the random access channel is below a predetermined threshold.

Broadening the frequency band for the random access channel corresponds to increasing the number of physical random access channels. For example, the number of physical random access channel may be changed from one physical random access channel (six resource blocks) to two physical random access channels (twelve resource blocks). Narrowing the frequency band for the random access channel corresponds to decreasing the number of physical random access channels. For example, the number of physical random access channel may be changed from two physical random access channels (twelve resource blocks) to one physical random access channel (six resource blocks).

Although the RACH resource management unit 2084 determines to increase or decrease the number of physical random access channels in the frequency direction in the above-mentioned example, the RACH resource management unit 2084 may determine to increase or decrease the number of physical random access channels in the time direction.

For example, the RACH resource management unit 2084 may determine to increase the number of physical random access channels in the time direction, either when the reception power on the frequency band for the random access channel is determined to be above the predetermined threshold or when the number of receptions of preambles on the random access channel is determined to be above the predetermined threshold by the RACH resource management unit 2084. For example, the RACH resource management unit 2084 may determine to change transmission timings on the random access channel from once in 10 ms to twice in 10 ms.

Alternatively, for example, the RACH resource management unit 2084 may determine to decrease the number of physical random access channels in the time direction, either when the reception power on the frequency band for the random access channel is determined to be below the predetermined threshold or when the number of receptions of preambles on the random access channel is determined to be below the predetermined threshold by the RACH resource management unit 2084. For example, the RACH resource management unit 2084 may determine to change transmission timings on the random access channel from twice in 10 ms to once in 10 ms.

Alternatively, when plural transmission patterns on the random access channel are defined in advance, the RACH resource management unit 2084 may select one of the transmission patterns based on at least one of the reception power on the frequency band for the random access channel in uplink and the number of receptions of preambles on the random access channel. For example, the RACH resource management unit 2084 may select a transmission pattern which decreases transmission opportunities on the random access channel, either when the reception power on the frequency band for the random access channel is determined to be below the predetermined threshold or when the number of receptions of preambles on the random access channel is determined to be below the predetermined threshold by the RACH resource management unit 2084. Alternatively, for example, the RACH resource management unit 2084 may select a transmission pattern which increases transmission opportunities on the random access channel, either when the reception power on the frequency band for the random access channel is determined to be above the predetermined threshold or when the number of receptions of preambles on the random access channel is determined to be above the predetermined threshold by the RACH resource management unit 2084. For example, the transmission patterns as shown in Table 1 may be used.

As described above, the RACH resource management unit 2084 increases or decreases the number of physical random access channels in the frequency direction or in the time direction based on the number of receptions of preambles on the random access channel or the reception power on the frequency band for the random access channel. Typically, the number of physical random access channels in the frequency direction or in the time direction corresponds to radio resources for the random access channel.

Alternatively, the RACH resource management unit 2084 may obtain the number of users in a standby status in the cell, the number of users in a communication status, the number of users in a Discontinuous Reception (DRX) status, the usage rate of the Center Processing Unit (CPU) in the base station apparatus, the usage rate of the memory, or the usage rate of the CPU in the core node, and then determine whether to restrict transmission on the random access channel by mobile stations based on the number of users in the standby status in the cell, the number of users in the communication status, the number of users in the DRX status, the usage rate of the CPU in the base station apparatus, the usage rate of the memory, or the usage rate of the CPU in the core node.

For example, the RACH resource management unit 2084 may determine to restrict transmission on the random access channel by mobile stations, when the number of users in the standby status in the cell is above a predetermined threshold, when the number of users in the communication status is above a predetermined threshold, when the number of users in the DRX status is above a predetermined threshold, when the usage rate of the CPU in the base station apparatus is above a predetermined threshold, when the usage rate of the memory is above a predetermined threshold, or when the usage rate of the CPU in the core node is above a predetermined threshold.

Alternatively, the RACH resource management unit 2084 may determine whether to restrict transmission on the random access channel by mobile stations based on the number of users in the standby status in the cell, the number of users in the communication status, the number of users in the DRX status, the usage rate of the CPU in the base station apparatus, the usage rate of the memory, the usage rate of the CPU in the core node, the reception power on the frequency band for the random access channel, and the number of receptions of preambles on the random access channel.

Alternatively, the RACH resource management unit 2084 may obtain the number of users in the standby status in the cell, the number of users in the communication status, the number of users in the DRX status, the usage rate of the CPU in the base station apparatus, the usage rate of the memory, or the usage rate of the CPU in the core node, and then determine whether to change the frequency band for the random access channel based on the number of users in the standby status in the cell, the number of users in the communication status, the number of users in the DRX status, the usage rate of the CPU in the base station apparatus, the usage rate of the memory, or the usage rate of the CPU in the core node.

For example, the RACH resource management unit 2084 may determine to increase the frequency band for the random access channel, when the number of users in the standby status in the cell is above a predetermined threshold, when the number of users in the communication status is above a predetermined threshold, or when the number of users in the DRX status is above a predetermined threshold.

For example, the RACH resource management unit 2084 may determine to decrease the frequency band for the random access channel, when the number of users in the standby status in the cell is below a predetermined threshold, when the number of users in the communication status is below a predetermined threshold, when the number of users in the DRX status is below a predetermined threshold, when the usage rate of the CPU in the base station apparatus is above a predetermined threshold, when the usage rate of the memory is above a predetermined threshold, or when the usage rate of the CPU in the core node is above a predetermined threshold.

Alternatively, the RACH resource management unit 2084 may determine whether to change the frequency band for the random access channel based on the number of users in the standby status in the cell, the number of users in the communication status, the number of users in the DRX status, the usage rate of the CPU in the base station apparatus, the usage rate of the memory, the usage rate of the CPU in the core node, the reception power on the frequency band for the random access channel, and the number of receptions of preambles on the random access channel.

Alternatively, the RACH resource management unit 2084 may restrict transmission on the random access channel by mobile stations or change the frequency band for the random access channel depending upon a time period. Alternatively, the RACH resource management unit 2084 may manually restrict transmission on the random access channel by mobile stations or change the frequency band for the random access channel. The manual restriction or change means that the operator for providing the radio communication system 1000 monitors statistical values for the reception power on the frequency band for the random access channel and the number of receptions of preambles on the random access channel and changes parameters regarding random access procedures in the radio communication system 1000.

The RACH resource management unit 2084 may determine whether to restrict transmission on the random access channel by mobile stations or whether to change the frequency band for the random access channel based on the number of receptions of preambles of dedicated preambles or the number of receptions of preambles of randomly transmitted preambles. Alternatively, the RACH resource management unit 2084 may make the determination based on the number of receptions of preambles of randomly transmitted preambles with high priority or the number of receptions of preambles of randomly transmitted preambles with low priority. Alternatively, the RACH resource management unit 2084 may make the determination based on the number of receptions of preambles of randomly transmitted preambles with high radio quality or the number of receptions of preambles of randomly transmitted preambles with low radio quality.

In this manner, determining whether to restrict transmission on the random access channel by mobile stations or whether to change the frequency band for the random access channel based on each of the dedicated preamble and the randomly transmitted preambles, based on each priority of the preambles, or based on each radio quality for the mobile stations allows for more fine-grained control based on priority, types of the random access channel, and radio quality for the mobile stations.

Alternatively, the RACH resource management unit 2084 may determine whether to restrict transmission on the random access channel by mobile stations or whether to change the frequency band for the random access channel based on the purpose of use of the random access channel, such as initial access, handover, an uplink scheduling request, an uplink synchronization establishment request, a restart of downlink communications, and so on.

In this manner, determining whether to restrict transmission on the random access channel by mobile stations or whether to change the frequency band for the random access channel for each purpose of use of the random access channel allows for more fine-grained control based on the purpose of use of the random access channel.

Alternatively, the RACH resource management unit 2084 may determine whether to change the range of dedicated preambles and the range of randomly transmitted preambles based on the number of receptions of dedicated preambles.

For example, the RACH resource management unit 2084 may broaden the range of dedicated preambles and narrow the range of randomly transmitted preambles accordingly, when the number of receptions of dedicated preambles is above a predetermined threshold. Alternatively, the RACH resource management unit 2084 may narrow the range of dedicated preambles and broaden the range of randomly transmitted preambles accordingly, when the number of receptions of dedicated preambles is below a predetermined threshold.

For example, the RACH resource management unit 2084 may broaden the range of randomly transmitted preambles and narrow the range of dedicated preambles accordingly, when the number of receptions of randomly transmitted preambles is above a predetermined threshold. Alternatively, the RACH resource management unit 2084 may narrow the range of randomly transmitted preambles and broaden the range of dedicated preambles accordingly, when the number of receptions of randomly transmitted preambles is below a predetermined threshold.

Assuming that preambles 0-15 among preambles 0-63 are assigned to dedicated preambles and preambles 16-63 are assigned to randomly transmitted preambles, for example, broadening the range of dedicated preambles means assigning preambles 0-31 to dedicated preambles and assigning preambles 32-63 to randomly transmitted preambles. It should be noted that preamble numbers such as 0-15 and 16-63 are illustrative only and other preamble numbers may be used.

When the RACH resource management unit 2084 determines to change the range of dedicated preambles and the range of randomly transmitted preambles, as described above, the RACH resource management unit 2084 provides to the call processing unit 210 a notification that the range of dedicated preambles and the range of randomly transmitted preambles are changed.

Alternatively, the RACH resource management unit 2084 may determine whether to change the range of randomly transmitted preambles with high priority and the range of randomly transmitted preambles with low priority based on the number of receptions of randomly transmitted preambles with high priority.

For example, the RACH resource management unit 2084 may broaden the range of randomly transmitted preambles with high priority and narrow the range of randomly transmitted preambles with low priority accordingly, when the number of receptions of randomly transmitted preambles with high priority is above a predetermined threshold. Alternatively, the RACH resource management unit 2084 may narrow the range of randomly transmitted preambles with high priority and broaden the range of randomly transmitted preambles with low priority accordingly, when the number of receptions of randomly transmitted preambles with high priority is below a predetermined threshold.

For example, the RACH resource management unit 2084 may broaden the range of randomly transmitted preambles with low priority and narrow the range of randomly transmitted preambles with high priority accordingly, when the number of receptions of randomly transmitted preambles with low priority is above a predetermined threshold. Alternatively, the RACH resource management unit 2084 may narrow the range of randomly transmitted preambles with low priority and broaden the range of randomly transmitted preambles with high priority accordingly, when the number of receptions of randomly transmitted preambles with low priority is below a predetermined threshold.

Assuming that preambles 0-15 among preambles 0-63 are assigned to randomly transmitted preambles with high priority and preambles 16-63 are assigned to randomly transmitted preambles with low priority, for example, broadening the range of randomly transmitted preambles with high priority means assigning preambles 0-31 to randomly transmitted preambles with high priority and assigning preambles 32-63 to randomly transmitted preambles with low priority. It should be noted that preamble numbers such as 0-15 and 16-63 are illustrative only and other preamble numbers may be used.

When the RACH resource management unit 2084 determines to change the range of dedicated preambles and the range of randomly transmitted preambles or to change the range of randomly transmitted preambles with high priority and the range of randomly transmitted preambles with low priority, as described above, the RACH resource management unit 2084 provides the determination to the call processing unit 210.

When the RACH resource management unit 2084 determines to change the range of randomly transmitted preambles with high priority and the range of randomly transmitted preambles with low priority, as described above, the RACH resource management unit 2084 provides to the call processing unit 210 a notification that the range of randomly transmitted preambles with high priority and the range of randomly transmitted preambles with low priority are changed.

Alternatively, the RACH resource management unit 2084 may determine whether to change the range of randomly transmitted preambles with high radio quality and the range of randomly transmitted preambles with low radio quality based on the number of receptions of randomly transmitted preambles with high radio quality.

For example, the RACH resource management unit 2084 may broaden the range of randomly transmitted preambles with high radio quality and narrow the range of randomly transmitted preambles with low radio quality accordingly, when the number of receptions of randomly transmitted preambles with high radio quality is above a predetermined threshold. Alternatively, the RACH resource management unit 2084 may narrow the range of randomly transmitted preambles with high radio quality and broaden the range of randomly transmitted preambles with low radio quality accordingly, when the number of receptions of randomly transmitted preambles with high radio quality is below a predetermined threshold.

For example, the RACH resource management unit 2084 may broaden the range of randomly transmitted preambles with low radio quality and narrow the range of randomly transmitted preambles with high radio quality accordingly, when the number of receptions of randomly transmitted preambles with low radio quality is above a predetermined threshold. Alternatively, the RACH resource management unit 2084 may narrow the range of randomly transmitted preambles with low radio quality and broaden the range of randomly transmitted preambles with high radio quality accordingly, when the number of receptions of randomly transmitted preambles with low radio quality is below a predetermined threshold.

Assuming that preambles 0-15 among preambles 0-63 are assigned to randomly transmitted preambles with high radio quality and preambles 16-63 are assigned to randomly transmitted preambles with low radio quality, for example, broadening the range of randomly transmitted preambles with high radio quality means assigning preambles 0-31 to randomly transmitted preambles with high radio quality and assigning preambles 32-63 to randomly transmitted preambles with low radio quality. It should be noted that preamble numbers such as 0-15 and 16-63 are illustrative only and other preamble numbers may be used.

When the RACH resource management unit 2084 determines to change the range of dedicated preambles and the range of randomly transmitted preambles or to change the range of randomly transmitted preambles with high radio quality and the range of randomly transmitted preambles with low radio quality, as described above, the RACH resource management unit 2084 provides the determination to the call processing unit 210.

When the RACH resource management unit 2084 determines to change the range of randomly transmitted preambles with high radio quality and the range of randomly transmitted preambles with low radio quality, as described above, the RACH resource management unit 2084 provides to the call processing unit 210 a notification that the range of randomly transmitted preambles with high radio quality and the range of randomly transmitted preambles with low radio quality are changed.

<Configuration of a Mobile Station Apparatus>

Figure 9:
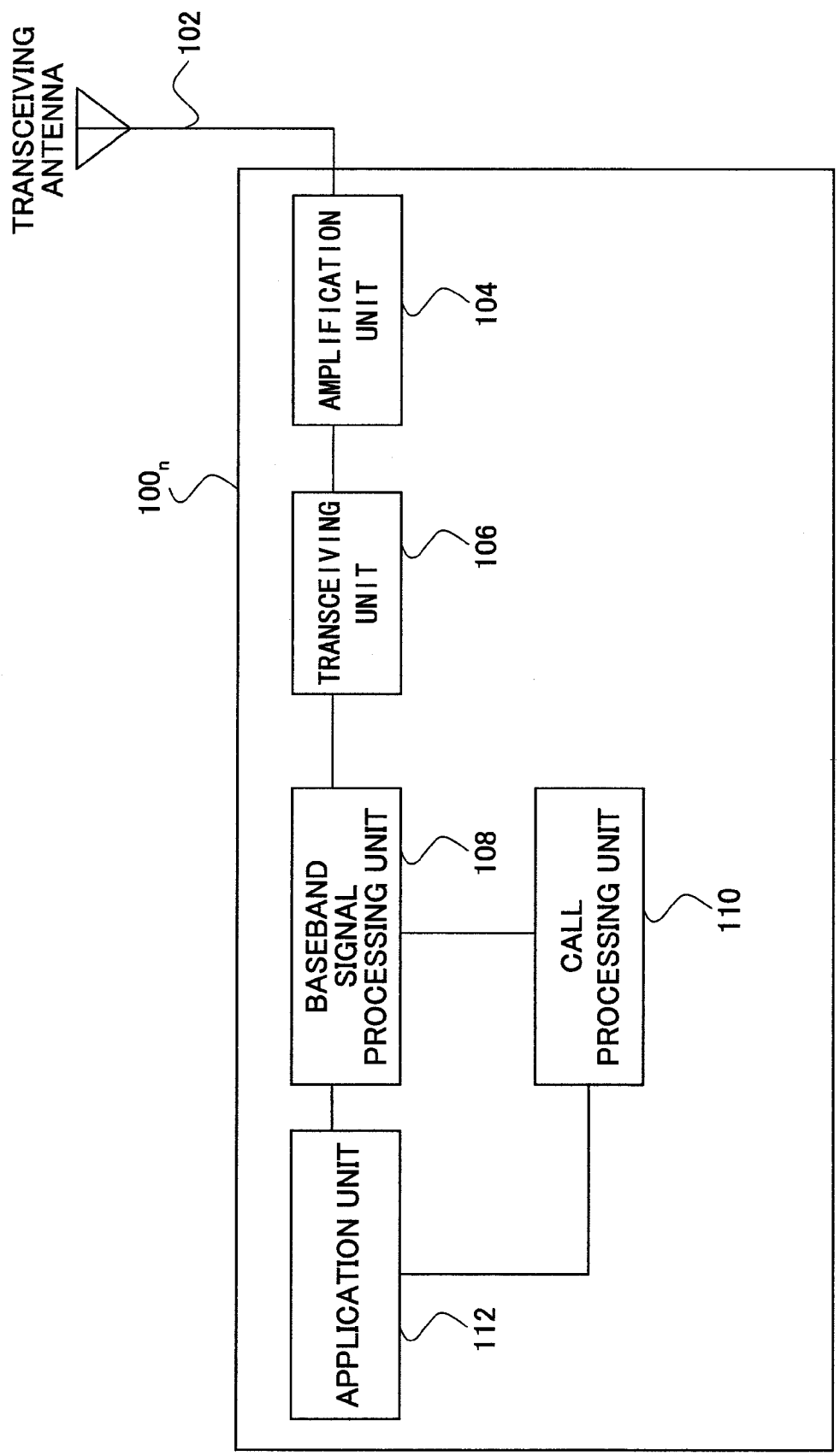
FIG. 9 shows a partial block diagram illustrating a mobile station according to an embodiment of the present invention.

Next, the mobile station $100_n$ according to an embodiment of the present invention is explained below with reference to FIG. 9.

The mobile station $100_n$ includes a transceiving antenna 102, an amplification unit 104, a transceiving unit 106, a baseband signal processing unit 108, a call processing unit 110, and an application unit 112.

Regarding downlink data, a radio frequency signal received by the transceiving antenna 102 is amplified by the amplification unit 104, and frequency-converted into a baseband signal by the transceiving unit 106. The baseband signal undergoes FFT processing, error correction decoding, reception processing for the retransmission control, and so on, and is forwarded to the application unit 112.

On the other hand, uplink data are input from the application unit 112 to the baseband signal processing unit 108. In the baseband signal processing unit 108, the uplink data undergoes transmission processing for the retransmission control (Hybrid ARQ (H-ARQ)), transmission format selection, channel coding, Inverse Fast Fourier Transform (IFFT) processing, and so on, and is forwarded to the transceiving unit 106. In the transceiving unit 106, the baseband signal output from the baseband signal processing unit 108 undergoes frequency conversion processing for converting the baseband signal to a radio frequency signal, which is then amplified by the amplification unit 104 and transmitted from the transceiving antenna 102.

The baseband signal processing unit 108 may measure radio quality in downlink. More specifically, the baseband signal processing unit 108 may measure the reception level, SIR, CQI, or path loss of the downlink reference signal. It should be noted that the path loss is calculated based on transmission power of the downlink reference signal in the base station apparatus and the reception level of the downlink reference signal.

The mobile station $100_n$ transmits signals on the random access channel in uplink, upon initial access, upon an uplink synchronization establishment request, upon handover, upon a scheduling request, and so on. For example, the application unit 112 may determine that the initial access, the uplink synchronization establishment request, the handover, the scheduling request, and so on are carried out, and then the baseband signal processing unit 108 may carry out transmission processing on the random access channel based on the determination. The transmission processing on the random access channel includes selection of preamble sequences for the random access channel, generating processes of the preamble sequences, measurement of quality information which is mapped to the random access channel, and so on. Signals on the random access channel which undergo transmission processing in the baseband signal processing unit 108 are transmitted to the base station apparatus 200 via the transceiving unit 106, the amplification unit 104, and the transceiving antenna 102.

When two levels of radio quality, i.e., "high" and "low" for radio quality for the mobile station are defined as types of random access preambles, the mobile station $100_n$ determines whether to transmit randomly transmitted preambles with high radio quality or randomly transmitted preambles with low radio quality based on radio quality measured by the baseband signal processing unit 108, and then transmits signals on the random access channel.

The baseband signal processing unit 108 carries out reception processing of broadcast information included in downlink data.

For example, when the broadcast information includes information that transmission on the random access channel by mobile stations is restricted, the baseband signal processing unit 108 may suspend transmission on the random access channel. In this case, the mobile station $100_n$ does not transmit signals on the random access channel, even when the mobile station $100_n$ determines that initial access, an uplink synchronization establishment request, handover, a scheduling request, and so on are performed.

Alternatively, for example, when the broadcast information includes information that transmission on the random access channel by mobile stations is not restricted, the baseband signal processing unit 108 may not suspend transmission on the random access channel. Namely, the baseband signal processing unit 108 may transmit signals on the random access channel as usual.

Transmission on the random access channel by mobile stations may be restricted in consideration of the predetermined priority class of the mobile station. For example, when the broadcast information includes information that transmission on the random access channel only by mobile stations with low priority is restricted and when the mobile station $100_n$ corresponds to the mobile station with low priority, the baseband signal processing unit 108 may suspend transmission on the random access channel. Alternatively, when the broadcast information includes information that transmission on the random access channel only by mobile stations with low priority is restricted and when the mobile station $100_n$ corresponds to the mobile station with high priority, the baseband signal processing unit 108 may not suspend transmission on the random access channel.

Alternatively, when the broadcast information includes information that the frequency band for the random access channel is changed, the baseband signal processing unit 108 transmits signals on the random access channel with the changed frequency band.

For example, when the broadcast information includes the number of frequency bands (the number of physical random access channels) for the random access channel and the frequency numbers or resource block numbers of the respective frequency bands (the frequency numbers or the resource block numbers of the respective physical random access channels), the baseband signal processing unit 108 transmits signals on the random access channel with the frequency band specified by the frequency numbers or the resource block numbers.

In addition, when the broadcast information includes information that the range of dedicated preambles and the range of randomly transmitted preambles are changed, the baseband signal processing unit 108 transmits the dedicated preamble or the randomly transmitted preamble based on the changed range of dedicated preambles and the changed range of randomly transmitted preambles.

Alternatively, when the broadcast information includes information that the range of randomly transmitted preambles with high priority and the range of randomly transmitted preambles with low priority are changed, the baseband signal processing unit 108 transmits the randomly transmitted preamble with high priority or the randomly transmitted preamble with low priority based on the changed range of randomly transmitted preambles with high priority and the changed range of randomly transmitted preambles with low priority.

Alternatively, when the broadcast information includes information that the range of randomly transmitted preambles with high radio quality and the range of randomly transmitted preambles with low radio quality are changed, the baseband signal processing unit 108 transmits the randomly transmitted preamble with high radio quality or the randomly transmitted preamble with low radio quality based on the changed range of randomly transmitted preambles with high radio quality and the changed range of randomly transmitted preambles with low radio quality.

The call processing unit 110 performs management of communications with the base station apparatus 200. The application unit 112 performs processing on an upper layer higher than the physical layer and the MAC layer.

<Communication Control Method of the Base Station Apparatus>

Figure 10:
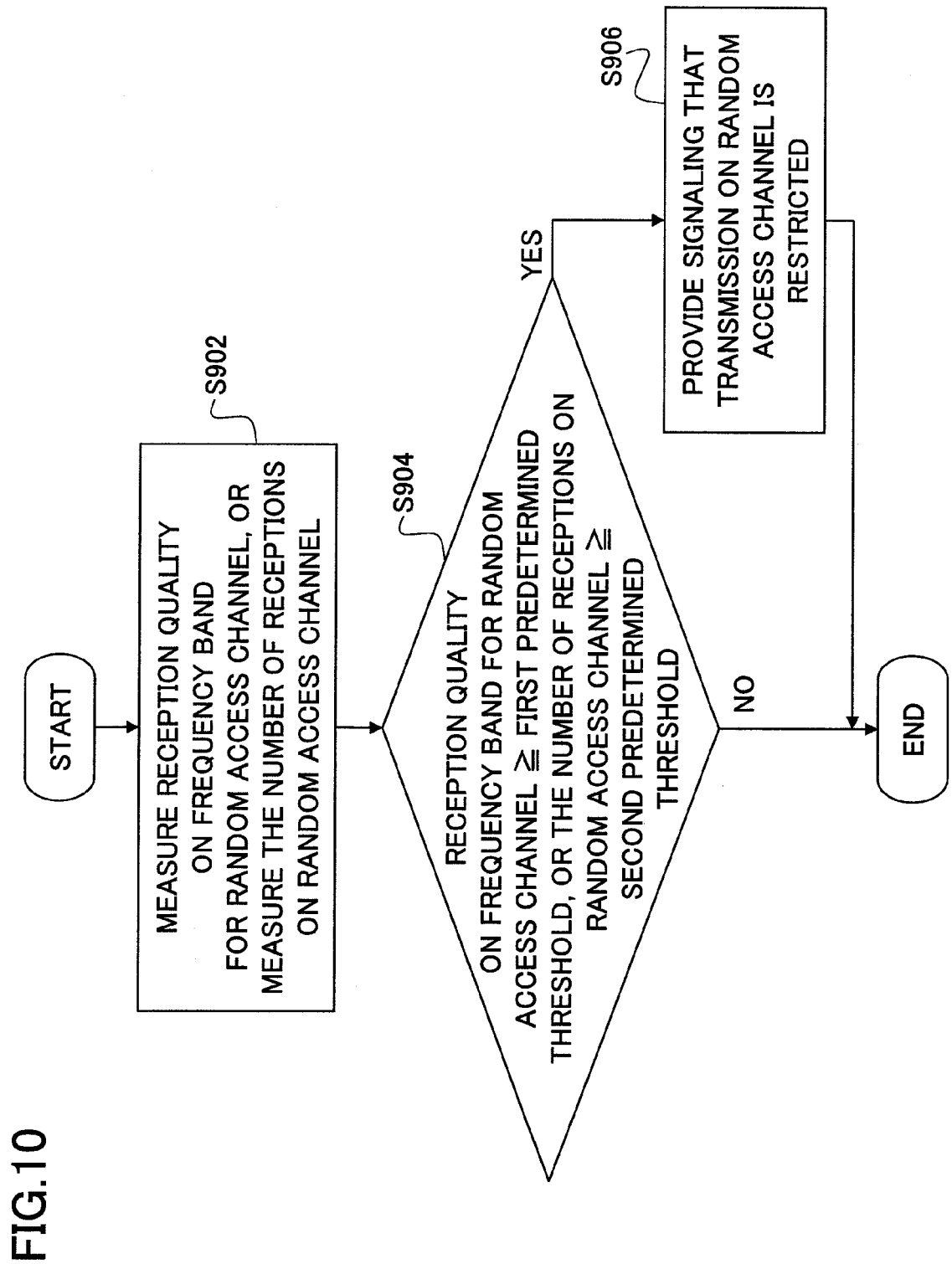
FIG. 10 shows a flowchart illustrating a communication control method according to an embodiment of the present invention.

Next, a communication control method in the base station apparatus 200 according to the embodiment of the present invention is explained below with reference to FIG. 10.

The base station apparatus 200 measures reception power on the frequency band for the random access channel in uplink or the number of receptions of preambles on the random access channel in uplink in the cell covered by the base station apparatus 200 (step S902).

The base station apparatus 200 determines whether the measured reception power on the frequency band for the random access channel in uplink is above a first predetermined threshold or whether the measured number of receptions of preambles on the random access channel in uplink is above a second predetermined threshold (step S904).

When the measured reception power on the frequency band for the random access channel in uplink is above the first predetermined threshold or when the measured number of receptions of preambles on the random access channel in uplink is above the second predetermined threshold (step S904: YES), the base station apparatus 200 provides, for each mobile station in the cell covered by the base station apparatus 200, a notification as broadcast information that transmission on the random access channel is restricted (step S906). Each mobile station which receives the notification that transmission on the random access channel is restricted suspends transmission on the random access channel.

When the measured reception power on the frequency band for the random access channel in uplink is below the first predetermined threshold and when the measured number of receptions of preambles on the random access channel in uplink is below the second predetermined threshold (step S904: NO), the method ends. In this case, transmission on the random access channel by mobile stations is not restricted.

In step S904, the base station apparatus 200 determines whether the measured reception power on the frequency band for the random access channel in uplink is above the first predetermined threshold or whether the measured number of receptions on the random access channel in uplink is above the second predetermined threshold. Alternatively, the base station apparatus 200 may determine whether the measured reception power on the frequency band for the random access channel in uplink is above the first predetermined threshold and whether the measured number of receptions on the random access channel in uplink is above the second predetermined threshold.

Next, a transmission control method in the base station apparatus 200 according to the embodiment of the present invention is explained below with reference to FIG. 11.

The base station apparatus 200 measures reception power, for mobile stations $100_n$ in the communication status, on the frequency band for the random access channel in uplink or the number of receptions of preambles on the random access channel in uplink in the cell covered by the base station apparatus 200 (step S1002).

The base station apparatus 200 determines whether the measured reception power on the frequency band for the random access channel in uplink is above a first predetermined threshold or whether the measured number of receptions of preambles on the random access channel in uplink is above a second predetermined threshold (step S1004).

When the measured reception power on the frequency band for the random access channel in uplink is above the first predetermined threshold or when the measured number of receptions of preambles on the random access channel in uplink is above the second predetermined threshold (step S1004: YES), the base station apparatus 200 provides, for each mobile station in the cell covered by the base station apparatus 200, a notification that the frequency bandwidth for the random access channel is broadened (step S1010). Each mobile station which receives the notification that the frequency bandwidth for the random access channel is broadened transmits signals on the random access channel with the broadened frequency bandwidth.

When the measured reception power on the frequency band for the random access channel in uplink is below the first predetermined threshold and when the measured number of receptions of preambles on the random access channel in uplink is below the second predetermined threshold (step S1004: NO), the method proceeds to step S1006.

In step S1006, the base station apparatus 200 determines whether the measured reception power on the frequency band for the random access channel in uplink is below a third predetermined threshold or whether the measured number of receptions of preambles on the random access channel in uplink is below a fourth predetermined threshold.

When the measured reception power on the frequency band for the random access channel in uplink is below the third predetermined threshold and when the measured number of receptions of preambles on the random access channel in uplink is below the fourth predetermined threshold (step S1006: YES), the base station apparatus 200 provides, for each mobile station in the cell covered by the base station apparatus 200, a notification that the frequency bandwidth for the random access channel is narrowed (step S1008). Each mobile station which receives the notification that the frequency bandwidth for the random access channel is narrowed transmits signals on the random access channel with the narrowed frequency bandwidth.

When the measured reception power on the frequency band for the random access channel in uplink is above the third predetermined threshold and when the measured number of receptions of preambles on the random access channel in uplink is above the fourth predetermined threshold (step S1006: YES), the method ends. In this case, the frequency band for the random access channel is not changed.

For example, narrowing or broadening the frequency bandwidth for the random access channel means decreasing or increasing the number of frequency bands for the random access channel. Specifically, narrowing or broadening the frequency bandwidth for the random access channel may mean decreasing or increasing the number of frequency bands, each of which includes six resource blocks, for the random access channel, i.e., decreasing or increasing the number of physical random access channels.

In step S1004, the base station apparatus 200 determines whether the measured reception power on the frequency band for the random access channel in uplink is above the first predetermined threshold or whether the measured number of receptions of preambles on the random access channel in uplink is above the second predetermined threshold. Alternatively, the base station apparatus 200 may determine whether the measured reception power on the frequency band for the random access channel in uplink is above the first predetermined threshold and whether the measured number of receptions of preambles on the random access channel in uplink is above the second predetermined threshold.

In step S1006, the base station apparatus 200 determines whether the measured reception power on the frequency band for the random access channel in uplink is below the third predetermined threshold or whether the measured number of receptions of preambles on the random access channel in uplink is below the fourth predetermined threshold. Alternatively, the base station apparatus 200 may determine whether the measured reception power on the frequency band for the random access channel in uplink is below the third predetermined threshold and whether the measured number of receptions of preambles on the random access channel in uplink is below the fourth predetermined threshold.

Next, a transmission control method in the base station apparatus 200 according to the embodiment of the present invention is explained below with reference to FIG. 12.

The base station apparatus 200 measures the number of receptions of dedicated preambles on the random access channel in uplink in the cell covered by the base station apparatus 200 (step S1202).

The base station apparatus 200 determines whether the measured number of receptions of dedicated preambles on the random access channel in uplink is above a first predetermined threshold (step S1204).

When the measured number of receptions of dedicated preambles on the random access channel in uplink is above the first predetermined threshold (step S1204: YES), the base station apparatus 200 provides, for each mobile station in the cell covered by the base station apparatus 200, a notification that the range of dedicated preambles on the random access channel is broadened and the range of randomly transmitted preambles on the random access channel is narrowed (step S1210). Each mobile station which receives the notification that the range of dedicated preambles on the random access channel is broadened and the range of randomly transmitted preambles on the random access channel is narrowed transmits the dedicated preamble within the broadened range of dedicated preambles and transmits the randomly transmitted preamble within the narrowed range of randomly transmitted preambles.

When the measured number of receptions of dedicated preambles on the random access channel in uplink is below the first predetermined threshold (step S1204: NO), the method proceeds to step S1206.

In step S1206, the base station apparatus 200 determines whether the measured number of receptions of dedicated preambles on the random access channel in uplink is below a second predetermined threshold.

When the measured number of receptions of dedicated preambles on the random access channel in uplink is below the second predetermined threshold (step S1206: YES), the base station apparatus 200 provides, for each mobile station in the cell covered by the base station apparatus 200, a notification that the range of dedicated preambles is narrowed and the range of randomly transmitted preambles is broadened (step S1208). Each mobile station which receives the notification that the range of dedicated preambles is narrowed and the range of randomly transmitted preambles is broadened transmits the dedicated preamble within the narrowed range of dedicated preambles and transmits the randomly transmitted preamble within the broadened range of randomly transmitted preambles.

When the measured number of receptions of dedicated preambles on the random access channel in uplink is above the second predetermined threshold (step S1206: NO), the method ends. In this case, the range of dedicated preambles and the range of randomly transmitted preambles on the random access channel are not changed.

For example, broadening or narrowing the range of dedicated preambles means increasing or decreasing the range of dedicated preamble IDs. In addition, for example, broadening or narrowing the range of randomly transmitted preambles means increasing or decreasing the range of randomly transmitted preamble IDs.

Next, a transmission control method in the base station apparatus 200 according to the embodiment of the present invention is explained below with reference to FIG. 13.

The base station apparatus 200 measures the number of receptions of randomly transmitted preambles with high priority on the random access channel in uplink in the cell covered by the base station apparatus 200 (step S1302).

The base station apparatus 200 determines whether the measured number of receptions of randomly transmitted preambles with high priority on the random access channel in uplink is above a first predetermined threshold (step S1304).

When the measured number of receptions of randomly transmitted preambles with high priority on the random access channel in uplink is above the first predetermined threshold (step S1304: YES), the base station apparatus 200 provides, for each mobile station in the cell covered by the base station apparatus 200, a notification that the range of randomly transmitted preambles with high priority on the random access channel is broadened and the range of randomly transmitted preambles with low priority on the random access channel is narrowed (step S1310). Each mobile station which receives the notification that the range of randomly transmitted preambles with high priority on the random access channel is broadened and the range of randomly transmitted preambles with low priority on the random access channel is narrowed transmits the randomly transmitted preamble with high priority within the broadened range of randomly transmitted preambles with high priority and transmits the randomly transmitted preamble with low priority within the narrowed range of randomly transmitted preambles with low priority.

When the measured number of receptions of randomly transmitted preambles with high priority on the random access channel in uplink is below the first predetermined threshold (step S1304: NO), the method proceeds to step S1306.

In step S1306, the base station apparatus 200 determines whether the measured number of receptions of randomly transmitted preambles with high priority on the random access channel in uplink is below a second predetermined threshold.

When the measured number of receptions of randomly transmitted preambles with high priority on the random access channel in uplink is below the second predetermined threshold (step S1306: YES), the base station apparatus 200 provides, for each mobile station in the cell covered by the base station apparatus 200, a notification that the range of randomly transmitted preambles with high priority is narrowed and the range of randomly transmitted preambles with low priority is broadened (step S1308). Each mobile station which receives the notification that the range of randomly transmitted preambles with high priority is narrowed and the range of randomly transmitted preambles with low priority is broadened transmits the randomly transmitted preamble with high priority within the narrowed range of randomly transmitted preambles with high priority and transmits the randomly transmitted preamble with low priority within the broadened range of randomly transmitted preambles with low priority.

When the measured number of receptions of randomly transmitted preambles with high priority on the random access channel in uplink is above the second predetermined threshold (step S1306: NO), the method ends. In this case, the range of randomly transmitted preambles with high priority and the range of randomly transmitted preambles with low priority on the random access channel are not changed.

For example, broadening or narrowing the range of randomly transmitted preambles with high priority means increasing or decreasing the range of IDs for randomly transmitted preambles with high priority. In addition, for example, broadening or narrowing the range of randomly transmitted preambles with low priority means increasing or decreasing the range of IDs for randomly transmitted preambles with low priority.

According to the communication control method in the base station apparatus 200 in FIG. 13, the range of randomly transmitted preambles with high priority and the range of randomly transmitted preambles with low priority are defined. Alternatively, a similar communication control method can be realized when the range of randomly transmitted preambles with high radio quality and the range of randomly transmitted preambles with low radio quality are defined.

According to the embodiment of the present invention, the amount of interference for the random access channel in uplink can be accurately measured. In addition, radio resources can be efficiently managed by restricting transmissions on the random access channel or changing the frequency resource for the random access channel based on the amount of interference for the random access channel.

According to the embodiment of the present invention, the amount of interference for the random access channel in uplink can be accurately measured and resources can be efficiently managed.

According to the embodiment of the present invention, the congestion level of dedicated preambles and randomly transmitted preambles can be estimated and resources can be efficiently allocated.

According to the embodiment of the present invention, the congestion level of randomly transmitted preambles with high priority and randomly transmitted preambles with low priority can be estimated and resources can be efficiently allocated.

In the above-mentioned example, the reception power on the frequency band for the random access channel and the number of receptions of preambles on the random access channel may be measured as an instantaneous value in the subframe for the random access channel or as an average value for one second, for example. Alternatively, the number of receptions of preambles on the random access channel may be measured as a total value for one second, for example. Alternatively, the reception power on the frequency band for the random access channel and the number of receptions of preambles on the random access channel may be measured as a value after filtering ($F_n$) of an average value or a total value for a predetermined time interval, for example, 100 ms, according to the equation (1) below.

$$F_n = (1-a)*F_{n-1} + a*M_n \quad (1)$$

$F_n$: the updated value after filtering
$F_{n-1}$: the previous value after filtering
a: a filtering coefficient
$M_n$: the average value or the total value of the predetermined time interval, for example, 100 ms The value of 'a' may be determined as $\frac{1}{2}^{(k/2)}$ (k=0, 1, 2, ...), for example. The predetermined time interval may be any value other than 100 ms, such as 200 ms and 80 ms.

In addition, the reception power on the frequency band for the random access channel and the number of receptions of preambles on the random access channel in the frequency direction may be measured and averaged. Specifically, when two frequency bands for the random access channel are used in the same subframe, the reception power on the frequency band for the random access channel and the number of receptions of preambles on the random access channel may be measured as an average value for the two frequency bands for the random access channel. Alternatively, the number of receptions of preambles on the random access channel may be measured as a total value.

Alternatively, the reception power on the frequency band for the random access channel and the number of receptions of preambles on the random access channel may be measured for each physical random access channel. In this case, the congestion level for each physical random access channel can be advantageously estimated. When the average value is measured, a simple arithmetic average value may be measured. Alternatively, an average value using a forgetting factor may be measured.

The base station apparatus according to the present invention may include a unit for setting the interval or the forgetting factor for the average value as a parameter.

The above-mentioned embodiment is explained with an example of the system where Evolved UTRA and UTRAN (another name: Long Term Evolution, or Super 3G) is applied. However, the base station apparatus and the communications control method according to an embodiment of the present invention are applicable to other systems employing the Single-Carrier Frequency Division Multiple Access or Orthogonal Frequency Division Multiple Access in uplink.

This international application claims the benefit of the priority dates of Japanese Patent Application No. 2007-010859 filed on Jan. 19, 2007, Japanese Patent Application No. 2007-018578 filed on Jan. 29, 2007, Japanese Patent Application No. 2007-150935 filed on Jun. 6, 2007, and Japanese Patent Application No. 2007-259240 filed on Oct. 2, 2007, the entire content of which is herein incorporated hereby by reference.

The invention claimed is:

1. A base station apparatus for communicating with a mobile station on a random access channel in uplink, comprising:
   a first measurement unit configured to measure the number of receptions of preambles on the random access channel in which dedicatedly assigned random access sequences are transmitted;
   a second measurement unit configured to measure the number of receptions of preambles on the random access channel in which randomly selected random access sequences among plural random access sequences are transmitted; and
   a sequence range control unit configured to control a range of dedicatedly assigned random access sequences and a range of randomly selected random access sequences based on at least one of the number of receptions of preambles measured by the first measurement unit and the number of receptions of preambles measured by the second measurement unit.

2. A base station apparatus for communicating with a mobile station on a random access channel in uplink, comprising:
   a first measurement unit configured to measure the number of receptions of preambles on the random access channel in which dedicatedly assigned random access sequences are transmitted; and
   a sequence range control unit configured to control a range of dedicatedly assigned random access sequences and a range of randomly selected random access sequences based on the number of receptions of preambles.

3. A base station apparatus for communicating with a mobile station on a random access channel in uplink, comprising:
   a first measurement unit configured to measure the number of receptions of preambles on the random access channel in which randomly selected random access sequences with high priority are transmitted; and
   a sequence range control unit configured to control a range of randomly selected random access sequences with high priority and a range of randomly selected random access sequences with low priority based on the number of receptions of preambles.

4. A base station apparatus for communicating with a mobile station on a random access channel in uplink, comprising:
   a first measurement unit configured to measure the number of receptions of preambles on the random access channel in which randomly selected random access sequences with high radio quality are transmitted; and
   a sequence range control unit configured to control a range of randomly selected random access sequences with high radio quality and a range of randomly selected random access sequences with low radio quality based on the number of receptions of preambles.

* * * * *